(12) United States Patent
Lorenzetti et al.

(10) Patent No.: US 8,173,728 B2
(45) Date of Patent: May 8, 2012

(54) STABILIZER COMPOSITION FOR POLYMERS

(75) Inventors: Cesare Lorenzetti, Grottammare (IT); Michela Bonora, Bologna (IT); Anna Bassi, Bologna (IT); Mirko Rossi, San Lazzaro di Savena (IT)

(73) Assignee: BASF SE, Ludwigshafen (DE)

( * ) Notice: Subject to any disclaimer, the term of this patent is extended or adjusted under 35 U.S.C. 154(b) by 835 days.

(21) Appl. No.: 12/223,141

(22) PCT Filed: Jan. 22, 2007

(86) PCT No.: PCT/EP2007/050579
§ 371 (c)(1),
(2), (4) Date: Jul. 23, 2008

(87) PCT Pub. No.: WO2007/088114
PCT Pub. Date: Aug. 9, 2007

(65) Prior Publication Data
US 2010/0222471 A1    Sep. 2, 2010

(30) Foreign Application Priority Data

Feb. 1, 2006  (EP) ..................................... 06101123

(51) Int. Cl.
*C08K 5/3492*  (2006.01)

(52) U.S. Cl. ........ 524/100; 524/140; 524/323; 524/525; 524/521; 524/515; 524/186; 524/449

(58) Field of Classification Search .................. 524/100, 524/140, 323, 525, 521, 515, 186, 449
See application file for complete search history.

(56) References Cited

U.S. PATENT DOCUMENTS

2004/0087446 A1   5/2004  Destro et al.
2005/0192385 A1*  9/2005  Zingg et al. ................... 524/100

FOREIGN PATENT DOCUMENTS

| EP | 1 342 748 A1 * | 9/2003 |
| EP | 1342748        | 9/2003 |
| GB | 1230293        | 4/1971 |
| WO | 93/03104       | 2/1993 |
| WO | WO 93/03104 *  | 2/1993 |
| WO | 00/23043 A1    | 4/2000 |

\* cited by examiner

*Primary Examiner* — Robert D. Harlan
(74) *Attorney, Agent, or Firm* — Tyler A. Stevenson

(57) ABSTRACT

The invention relates to stabilized thermoplastic polymers, in particular polyolefin films. The stabilizing composition contains a tertiary amine with a molecular weight greater than 400 g/mol, a UV-absorber and/or a sterically hindered amine light stabilizer (HALS). Further aspects of the invention are a process for stabilizing thermoplastic polymers and the use of the above composition for stabilizing thermoplastic polymers.

14 Claims, No Drawings

STABILIZER COMPOSITION FOR POLYMERS

The invention relates to stabilized thermoplastic polymers, in particular polyolefin films. The stabilizing composition contains a tertiary amine with a molecular weight greater than 400 g/mol, a UV-absorber and/or a sterically hindered amine light stabilizer (HALS). Further aspects of the invention are a process for stabilizing thermoplastic polymers and the use of the above composition for stabilizing thermoplastic polymers.

Tertiary amines, in particular bridged amine compounds, such as diazabicyclooctane (DABCO) and triazadamantane derivatives in combination with sterically hindered amines are disclosed in WO 00/09604 and in WO 98/36023. The tertiary amines described therein are all of low molecular weight, which leads to problems during processing of the polymers due to their volatility and high migration rate.

It has now been found that the incorporation of aliphatic tertiary amines, which need not to be bridged, leads to a strong synergistic effect with UV-absorbers and/or sterically hindered amine light stabilizers (HALS). The synergistic effects are amplified when the polymers are exposed to a sulphur-based pesticide treatment, a common practice in greenhouse applications. Under such conditions the stability of polymers containing tertiary amines and UV-absorbers is particularly good.

The combination of UV-absorbers, tertiary amines and HALS provides in many cases the best stabilization.

Additionally, the photostability of UV-absorbers is increased. In particular hydroxyphenyl triazine UV-absorbers are relatively susceptible to the interaction with pesticides, especially towards sulphur-based pesticides. The use of a small amount of an aliphatic tertiary amine with high molecular weight increases their durability, that is, their persistency in the polymer articles.

This is particularly important for films used as greenhouse covers or for mulching. These structures are usually made of low density polyethylene (LDPE), linear low density polyethylene (LLDPE), ethylvinylacetate (EVA) or ethylene/butylacrylate (EBA) and contain several additives with a functional effect: antioxidants, such as phenols, phosphates, lactones or hydroxylamines, slip agents and anti-blocking additives, such as erucamide, oleamide or silica, mineral fillers, such as kaolin, Ca carbonate, Barium sulphate, carbon black, hydrotalcite and pigments, such as Smartlight® RL 1000. They are typically stabilized with HALS, with or without UV-absorbers.

Beside films, raffia, for example made of HDPE, PP, LDPE is frequently used with the same purposes in greenhouse or mulching applications.

The films and raffia are frequently exposed to the chemicals utilized as pesticides, herbicides and soil disinfectants used to protect crops and flowers. Very often, such compounds are based on chlorine, sulphur and metals (Cu, Fe). All these species are able to react with the stabilizers, leading to premature degradation of the film. Sulphur is known to be very effective, both as elemental powder sublimated or sprayed in the greenhouses and as part of active molecules (e.g. Vapam).

Beside the interaction with the stabilizers, sulphur is suspected to interact directly with the polyolefinic matrix, accelerating its degradation.

Finally, sulphur and sulphur-based compounds can interact with hydroxyphenil-triazines, leading not only to premature degradation but also to the loss of the UV-filter effect, used to improve productivity of the crops.

Some types of crops are in fact degraded by the UV-components of solar radiation, which must be filtered off to obtain high quality and yields. Additionally, some micro-organisms, e.g. *Botrytis Cinerea*, can proliferate under specific UV-irradiation. These pests are harmful for the cultivation of some varieties of roses [R. Reuven et al., Development of photoselective PE films for control of foliar pathogens in greenhouse-grown crops, Plasticulture No. 102, pg. 7 (1994); Y. Eheshel et al., "The use of UV absorbing plastic sheets to protect crops against insects and spread of virus diseases", CIPA Congress 1997].

PP or PE tapes used as artificial grass are another application that combines a high exposure to UV-light (with the subsequent need for stabilization) with contamination of sulphur, used as vulcanizer for the rubber that represents the bottom of the artificial grass. The stability of such systems can be further affected by the presence of pigments that can act as pro-degradants.

One aspect of the invention is a stabilized polymer composition comprising
a) a thermoplastic polymer;
b) a tertiary amine with a molecular weight greater than 400 g/mol, which is not a 2,2,6,6 tetramethylpiperidine derivative;
c1) a UV-absorber selected from the group consisting of the hydroxyphenyl benzotriazoles, hydroxyphenyl triazines, hydroxy benzophenones and oxalic anilides; or
c2) a light stabilizer from the class of sterically hindered amines; or
c3) a mixture of the UV-absorber, component c1) and the sterically hindered amine, component c2).

In particular one aspect of the invention is a stabilized polymer composition comprising
a) a non halogen containing thermoplastic polymer;
b) an aliphatic tertiary amine with a molecular weight greater than 400 g/mol, which is not a 2,2,6,6 tetramethylpiperidine derivative;
c1) a UV-absorber selected from the group consisting of the hydroxyphenyl benzotriazoles, hydroxyphenyl triazines, hydroxy benzophenones and oxalic anilides; or
c2) a light stabilizer from the class of sterically hindered amines; or
c3) a mixture of the UV-absorber, component c1) and the sterically hindered amine, component c2).

Preferably the tertiary amine has a molecular weight of more than 500 g/mol, in particular of more than 700 g/mol.

In some cases it may be sufficient that the composition comprises a tertiary amine and a UV-absorber, as defined above. However, when maximum stabilization is required, the composition comprises a tertiary amine, a UV-absorber and a sterically hindered amine.

Examples of thermoplastic polymers are given below.

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Polymers derived from α,β-unsaturated acids and derivatives thereof such as polyacrylates and polymethacrylates; polymethyl methacrylates, polyacrylamides and polyacrylonitriles, impact-modified with butyl acrylate.

9. Copolymers of the monomers mentioned under 8) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

10. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

11. Homopolymers and copolymers of cyclic ethers such as polyalkylene glycols, polyethylene oxide, polypropylene oxide or copolymers thereof with bisglycidyl ethers.

12. Polyacetals such as polyoxymethylene and those polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with styrene polymers or polyamides.

14. Polyurethanes derived from hydroxyl-terminated polyethers, polyesters or polybutadienes on the one hand and aliphatic or aromatic polyisocyanates on the other, as well as precursors thereof.

15. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

16. Polyureas, polyimides, polyamide-imides, polyetherimids, polyesterimids, polyhydantoins and polybenzimidazoles.

17. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

18. Polycarbonates and polyester carbonates.

19. Polyketones.

20. Polysulfones, polyether sulfones and polyether ketones.

21. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Preferably the thermoplastic polymer is low density polyethylene (LDPE), linear low density polyethylene (LLDPE), polypropylene (PP) or ethylvinylacetate (EVA).

In a specific embodiment the composition is in the form of a film or tape.

For example the hydroxybenzophenone is of formula I

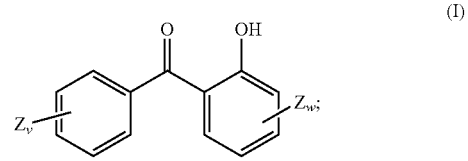

the 2-hydroxyphenylbenzotriazole is of formula IIa, IIb or IIc

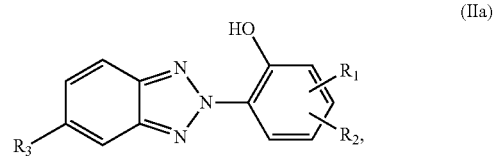

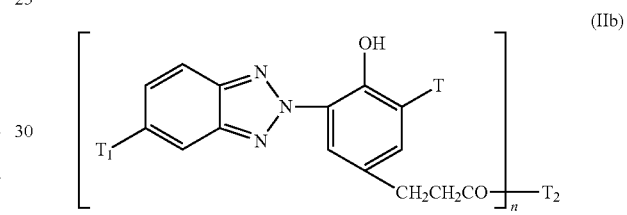

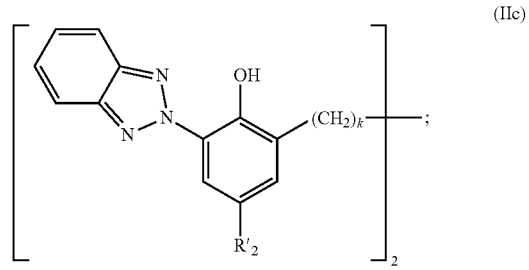

the 2-hydroxyphenyltriazine is of formula III

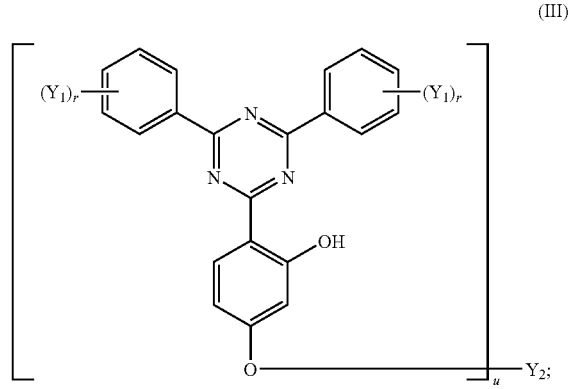

and the oxanilide is of formula (IV)

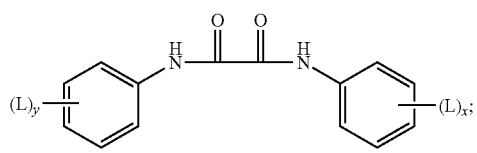 (IV)

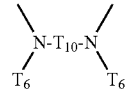

wherein
in the compounds of the formula (I) v is an integer from 1 to 3 and w is 1 or 2 and the substituents Z independently of one another are hydrogen, halogen, hydroxyl or alkoxy having 1 to 12 carbon atoms;
in the compounds of the formula (IIa),
$R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

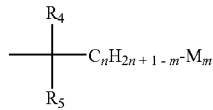

in which
$R_4$ and $R_5$ independently of one another are alkyl having in each case 1 to 5 carbon atoms, or $R_4$, together with the radical $C_nH_{2n+1-m}$, forms a cycloalkyl radical having 5 to 12 carbon atoms,
m is 1 or 2, n is an integer from 2 to 20 and
M is a radical of the formula —$COOR_6$ in which
$R_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety,
$R_2$ is hydrogen, halogen, alkyl having 1 to 18 carbon atoms, and phenylalkyl having 1 to 4 carbon atoms in the alkyl moiety, and
$R_3$ is hydrogen, chlorine, alkyl or alkoxy having in each case 1 to 4 carbon atoms or —$COOR_6$ in which $R_6$ is as defined above, at least one of the radicals $R_1$ and $R_2$ being other than hydrogen;
in the compounds of the formula (IIb)
T is hydrogen or alkyl having 1 to 6 carbon atoms,
$T_1$ is hydrogen, chlorine or alkyl or alkoxy having in each case 1 to 4 carbon atoms,
n is 1 or 2 and,
if n is 1,
$T_2$ is chlorine or a radical of the formula —$OT_3$ or

and,
if n is 2, $T_2$ is a radical of the formula

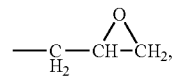

or —O-$T_9$-O—;
in which
$T_3$ is hydrogen, alkyl which has 1 to 18 carbon atoms and is unsubstituted or substituted by 1 to 3 hydroxyl groups or by —$OCOT_6$, alkyl which has 3 to 18 carbon atoms, is interrupted once or several times by —O— or —$NT_6$- and is unsubstituted or substituted by hydroxyl or —$OCOT_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —$CH_2CH(OH)$-$T_7$ or $$-\underset{H_2}{C}-\overset{O}{\overset{|}{CH}-CH_2},$$

$T_4$ and $T_5$ independently of one another are hydrogen, alkyl having 1 to 18 carbon atoms, alkyl which has 3 to 18 carbon atoms and is interrupted once or several times by —O— or —$NT_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms,
$T_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms, phenylalkyl having 1 to 4 carbon atoms in the alkyl moiety,
$T_7$ is hydrogen, alkyl having 1 to 18 carbon atoms, phenyl which is unsubstituted or substituted by hydroxyl, phenylalkyl having 1 to 4 carbon atoms in the alkyl moiety, or —$CH_2OT_8$,
$T_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety,
$T_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —$CH_2CH(OH)CH_2OT_{11}OCH_2CH(OH)CH_2$— or —$CH_2$—$C(CH_2OH)_2$—$CH_2$—,
$T_{10}$ is alkylene which has 2 to 20 carbon atoms and can be interrupted once or several times by —O—, or cyclohexylene,
$T_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or
$T_{10}$ and $T_6$, together with the two nitrogen atoms, are a piperazine ring;

in the compounds of formula (IIc)
R'$_2$ is C$_1$-C$_{12}$alkyl and k is a number from 1 to 4;
in the compounds of the formula (III)
u is 1 or 2 and r is an integer from 1 to 3, the substituents
Y$_1$ independently of one another are hydrogen, hydroxyl, phenyl or halogen, halogenomethyl, alkyl having 1 to 12 carbon atoms, alkoxy having 1 to 18 carbon atoms, alkoxy having 1 to 18 carbon atoms which is substituted by a group —COO(C$_1$-C$_{18}$alkyl);
if u is 1,
Y$_2$ is alkyl having 1 to 18 carbon atoms, phenyl which is unsubstituted or substituted by hydroxyl, halogen, alkyl or alkoxy having 1 to 18 carbon atoms;
alkyl which has 1 to 12 carbon atoms and is substituted by —COOH, —COOY$_8$, —CONH$_2$, —CONHY$_9$, —CONY$_9$Y$_{10}$, —NH$_2$, —NHY$_9$, —NY$_9$Y$_{10}$, —NHCOY$_{11}$, —CN and/or —OCOY$_{11}$;
alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or,
if u is 2,
Y$_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—Y$_{16}$—CO—, —CO—NH—Y$_{17}$—NH—CO— or —(CH$_2$)$_m$—CO$_2$—Y$_{18}$—OCO—(CH$_2$)$_m$, in which
m is 1, 2 or 3,
Y$_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$- and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety,
Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxaalkylene or azaalkylene having in each case 3 to 9 carbon atoms,
Y$_{11}$ is alkyl having 1 to 18 carbon atoms, alkenyl having 2 to 18 carbon atoms or phenyl,
Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino,
Y$_{13}$ is alkyl having 1 to 18 carbon atoms, phenyl or alkylphenyl having 1 to 8 carbon atoms in the alkyl radical,
Y$_{14}$ is alkyl having 1 to 12 carbon atoms or phenyl,
Y$_{15}$ is alkylene having 2 to 10 carbon atoms, phenylene or a group -phenylene-M-phenylene- in which M is —O—, —S—, —SO$_2$—, —CH$_2$— or —C(CH$_3$)$_2$—,
Y$_{16}$ is alkylene, oxaalkylene or thiaalkylene having in each case 2 to 10 carbon atoms, phenylene or alkenylene having 2 to 6 carbon atoms,
Y$_{17}$ is alkylene having 2 to 10 carbon atoms, phenylene or alkylphenylene having 1 to 11 carbon atoms in the alkyl moiety, and Y$_{18}$ is alkylene having 2 to 10 carbon atoms or alkylene which has 4 to 20 carbon atoms and is interrupted once or several times by oxygen;
in the compounds of the formula (IV) x is an integer from 1 to 3 and the substituents L independently of one another are hydrogen, alkyl, alkoxy or alkylthio having in each case 1 to 22 carbon atoms, phenoxy or phenylthio.

C$_1$-C$_{18}$alkyl may be linear or branched. Examples of alkyl having up to 18 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl and octadecyl.

In the compounds of the formula (IIa) R$_1$ can be hydrogen or alkyl having 1 to 24 carbon atoms, such as methyl, ethyl, propyl, butyl, hexyl, octyl, nonyl, dodecyl, tetradecyl, hexadecyl, octadecyl, nonadecyl and eicosyl and also corresponding branched isomers. Furthermore, in addition to phenylalkyl having 1 to 4 carbon atoms in the alkyl moiety, for example benzyl, R$_1$ can also be cycloalkyl having 5 to 8 carbon atoms, for example cyclopentyl, cyclohexyl and cyclooctyl, or a radical of the formula

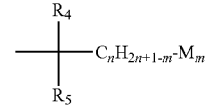

in which R$_4$ and R$_5$ independently of one another are alkyl having in each case 1 to 5 carbon atoms, in particular methyl, or R$_4$, together with the C$_n$H$_{2n+1-m}$ radical, forms a cycloalkyl radical having 5 to 12 carbon atoms, for example cyclohexyl, cyclooctyl and cyclodecyl. M is a radical of the formula —COOR$_6$ in which R$_6$ is not only hydrogen but also alkyl having 1 to 12 carbon atoms or alkoxyalkyl having 1 to 20 carbon atoms in each of the alkyl and alkoxy moieties. Suitable alkyl radicals R$_6$ are those enumerated for R$_1$. Examples of suitable alkoxyalkyl groups are —C$_2$H$_4$OC$_2$H$_5$, —C$_2$H$_4$OC$_8$H$_{17}$ and —C$_4$H$_8$OC$_4$H$_9$. As phenylalkyl having 1 to 4 carbon atoms, R$_6$ is, for example, benzyl, cumyl, α-methylbenzyl or phenylbutyl.

In addition to hydrogen and halogen, for example chlorine and bromine, R$_2$ can also be alkyl having 1 to 18 carbon atoms. Examples of such alkyl radicals are indicated in the definitions of R$_1$. R$_2$ can also be phenylalkyl having 1 to 4 carbon atoms in the alkyl moiety, for example benzyl, a-methylbenzyl and cumyl.

Halogen as a substituent means in all cases fluorine, chlorine, bromine or iodine, preferably chlorine or bromine and more preferably chlorine.

At least one of the radicals R$_1$ and R$_2$ must be other than hydrogen.

In addition to hydrogen or chlorine, R$_3$ is also alkyl or alkoxy having in each case 1 to 4 carbon atoms, for example methyl, butyl, methoxy and ethoxy, and also —COOR$_6$.

In the compounds of the formula (IIb) T is hydrogen or alkyl having 1 to 6 carbon atoms, such as methyl and butyl, T$_1$ is not only hydrogen or chlorine, but also alkyl or alkoxy having in each case 1 to 4 carbon atoms, for example methyl, methoxy and butoxy, and, if n is 1, T$_2$ is chlorine or a radical of the formula —OT$_3$ or —NT$_4$T$_5$. T$_3$ is here hydrogen or alkyl having 1 to 18 carbon atoms (cf. the definition of $R_1$). These alkyl radicals can be substituted by 1 to 3 hydroxyl groups or by a radical —$OCOT_6$. Furthermore, $T_3$ can be alkyl having 3 to 18 carbon atoms (cf. the definition of $R_1$) which is interrupted once or several times by —O— or —$NT_6$- and is unsubstituted or substituted by hydroxyl or —$OCOT_6$. Examples of $T_3$ as cycloalkyl are cyclopentyl, cyclohexyl or cyclooctyl. $T_3$ can also be alkenyl having 2 to 18 carbon atoms. Suitable alkenyl radicals are derived from the alkyl radicals enumerated in the definitions of $R_1$. These alkenyl radicals can be substituted by hydroxyl. Examples of $T_3$ as phenylalkyl are benzyl, phenylethyl, cumyl, α-methylbenzyl or benzyl. $T_3$ can also be a radical of the formula —$CH_2CH(OH)$-$T_7$ or

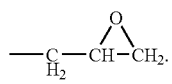

Like $T_3$, $T_4$ and $T_5$ can, independently of one another, be not only hydrogen but also alkyl having 1 to 18 carbon atoms or alkyl which has 3 to 18 carbon atoms and is interrupted once or several times by —O— or —$NT_6$-. $T_4$ and $T_5$ can also be cycloalkyl having 5 to 12 carbon atoms, for example cyclopentyl, cyclohexyl and cyclooctyl. Examples of $T_4$ and $T_5$ as alkenyl groups can be found in the illustrations of $T_3$. Examples of $T_4$ and $T_5$ as phenylalkyl having 1 to 4 carbon atoms in the alkyl moiety are benzyl or phenylbutyl. Finally, these substituents can also be hydroxyalkyl having 1 to 3 carbon atoms.

If n is 2, $T_2$ is a divalent radical of the formula

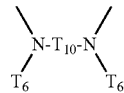

or —O-$T_9$-O—.

In addition to hydrogen, $T_6$ (see above also) is alkyl, cycloalkyl, alkenyl, aryl or phenylalkyl; examples of such radicals have already been given above.

In addition to hydrogen and the phenylalkyl radicals and long-chain alkyl radicals mentioned above, $T_7$ can be phenyl or hydroxyphenyl and also —$CH_2OT_8$ in which $T_8$ can be one of the alkyl, alkenyl, cycloalkyl, aryl or phenylalkyl radicals enumerated.

The divalent radical $T_9$ can be alkylene having 2 to 8 carbon atoms, and such radicals can also be branched. This also applies to the alkenylene and alkynylene radicals $T_9$. As well as cyclohexylene, $T_9$ can also be a radical of the formula —$CH_2CH(OH)CH_2OT_{11}OCH_2CH(OH)CH_2$— or —$CH_2$—$C(CH_2OH)_2$—$CH_2$—.

$T_{10}$ is a divalent radical and, in addition to cyclohexylene, is also alkylene which has 2 to 20 carbon atoms and which can be interrupted once or several times by —O—. Suitable alkylene radicals are derived from the alkyl radicals mentioned in the definitions of $R_1$.

$T_{11}$ is also an alkylene radical. It contains 2 to 8 carbon atoms or, if it is interrupted once or several times by —O—, 4 to 10 carbon atoms. $T_{11}$ is also 1,3-cyclohexylene, 1,4-cyclohexylene, 1,3-phenylene or 1,4-phenylene.

Together with the two nitrogen atoms, $T_6$ and $T_{10}$ can also be a piperazine ring.

Examples of alkyl, alkoxy, phenylalkyl, alkylene, alkenylene, alkoxyalkyl and cycloalkyl radicals and also alkylthio, oxaalkylene or azoalkylene radicals in the compounds of the formulae (I), (IIa), (IIb), (IIc), (III) and IV) can be deduced from the above statements.

Within the benzotriazole UV-absorbers those according to formula IIa are in general preferred.

The UV absorbers of the formulae (I), (IIa), (IIb), (IIc), (III) and (IV) are known per se and are described, together with their preparation in, for example, WO 96/28431, EP-A-323 408, EP-A-57 160, U.S. Pat. No. 5,736,597 (EP-A-434 608), U.S. Pat. No. 4,619,956, DE-A 31 35 810 and GB-A 1 336 391. Preferred meanings of substituents and individual compounds can be deduced from the documents mentioned.

In another embodiment the UV-absorber of the class of hydroxyphenyl triazines is of formula (IV)

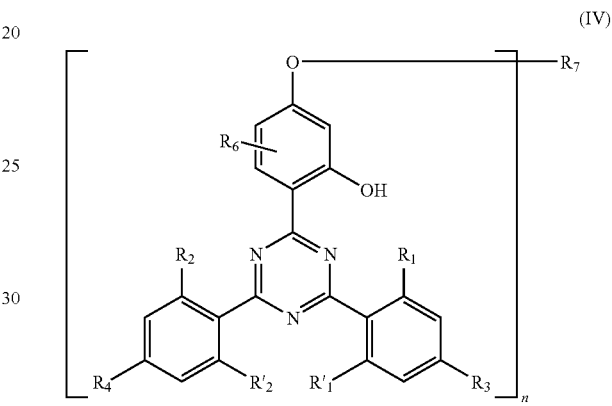

in which n is 1 or 2;

$R_1$, $R'_1$, $R_2$ and $R'_2$, independently of one another, are H, OH, $C_1$-$C_{12}$alkyl; $C_2$-$C_6$alkenyl; $C_1$-$C_{12}$alkoxy; $C_2$-$C_{18}$alkenoxy; halogen; trifluoromethyl; $C_7$-$C_{11}$phenylalkyl; phenyl; phenyl which is substituted by $C_1$-$C_{18}$alkyl, $C_1$-$C_{18}$alkoxy or halogen; phenoxy; or phenoxy which is substituted by $C_1$-$C_{18}$alkyl, $C_1$-$C_{18}$alkoxy or halogen;

$R_3$ and $R_4$, independently of one another, are H, $C_1$-$C_{12}$alkyl; $OR'_7$; $C_2$-$C_6$alkenyl; $C_2$-$C_{18}$alkenoxy; halogen; trifluoromethyl; $C_7$-$C_{11}$-phenylalkyl; phenyl; phenyl which is substituted by $C_1$-$C_{18}$alkyl, $C_1$-$C_{18}$alkoxy or halogen; phenoxy; or phenoxy which is substituted by $C_1$-$C_{18}$alkyl, $C_1$-$C_{18}$alkoxy or halogen;

$R_6$ is hydrogen, $C_1$-$C_{24}$alkyl, $C_6$-$C_{12}$cycloalkyl or $C_7$-$C_{16}$-phenylalkyl;

$R_7$, in the case where n=1, and $R'_7$, independently of one another, are hydrogen or $C_1$-$C_{18}$alkyl; or are $C_1$-$C_{12}$alkyl which is substituted by OH, $C_1$-$C_{18}$alkoxy, allyloxy, halogen, —COOH, —$COOR_8$, —$CONH_2$, —$CONHR_9$, —$CON(R_9)$ ($R_{10}$), —$NH_2$, —$NHR_9$, —$N(R_9)(R_{10})$, —$NHCOR_{11}$, —CN, —$OCOR_{11}$, phenoxy and/or phenoxy which is substituted by $C_1$-$C_{18}$alkyl, $C_1$-$C_{18}$alkoxy or halogen; or $R_7$ is $C_3$-$C_{50}$alkyl which is interrupted by —O— and may be substituted by OH; or $R_7$ is $C_3$-$C_6$alkenyl; glycidyl; $C_5$-$C_{12}$cycloalkyl; cyclohexyl which is substituted by OH, $C_1$-$C_4$alkyl or —$OCOR_{11}$; $C_7$-$C_{11}$phenylalkyl which is unsubstituted or substituted by OH, $C_1$ or $CH_3$; —CO—$R_{12}$ or —$SO_2$—$R_{13}$;

$R_7$, in the case where n=2, is $C_2$-$C_{16}$alkylene, $C_4$-$C_{12}$alkenylene, xylylene, $C_3$-$C_{20}$alkylene which is interrupted by O and/or substituted by OH, or is a group of the formula —$CH_2CH(OH)CH_2O$—$R_{20}$—$OCH_2CH(OH)$ $CH_2$—, —CO—$R_{21}$—CO—, —CO—NH—$R_{22}$—NH—

CO— or —$(CH_2)_m$—COO—$R_{23}$—OOC—$(CH_2)_m$—, in which m is a number in the range from 1 to 3, or is $$\text{HO-cyclohexyl-CO-O-CH}_2\text{-cyclohexyl-OH}$$

$R_8$ is $C_1$-$C_{18}$alkyl; $C_2$-$C_{18}$alkenyl; hydroxyethyl; $C_3$-$C_{50}$alkyl which is interrupted by O, NH, $NR_9$ or S and/or is substituted by OH; $C_1$-$C_4$alkyl which is substituted by —$P(O)(OR_{14})_2$, —$N(R_9)(R_{10})$ or —$OCOR_{11}$ and/or OH; glycidyl; $C_5$-$C_{12}$cycloalkyl; phenyl; $C_7$-$C_{14}$alkylphenyl or $C_7$-$C_{11}$phenylalkyl;

$R_9$ and $R_{10}$, independently of one another, are $C_1$-$C_{12}$alkyl; $C_3$-$C_{12}$alkoxyalkyl; $C_4$-$C_{16}$dialkylaminoalkyl or $C_5$-$C_{12}$cycloalkyl, or $R_9$ and $R_{10}$ together are $C_3$-$C_9$alkylene or -oxaalkylene or -azaalkylene;

$R_{11}$ is $C_1$-$C_{18}$alkyl; $C_2$-$C_{18}$alkenyl or phenyl; $C_2$-$C_{12}$hydroxyalkyl; cyclohexyl; or is $C_3$-$C_{50}$alkyl which is interrupted by —O— and may be substituted by OH;

$R_{12}$ is $C_1$-$C_{18}$alkyl; $C_2$-$C_{18}$alkenyl; phenyl; $C_1$-$C_{18}$alkoxy; $C_3$-$C_{18}$alkenyloxy; $C_3$-$C_{50}$alkoxy which is interrupted by O, NH, $NR_9$ or S and/or substituted by OH; cyclohexyloxy; $C_7$-$C_{14}$alkylphenoxy; $C_7$-$C_{11}$-phenylalkoxy; phenoxy; $C_1$-$C_{12}$alkylamino; phenylamino; tolylamino or naphthylamino;

$R_{13}$ is $C_1$-$C_{12}$alkyl; phenyl; naphthyl or $C_7$-$C_{14}$alkylphenyl;

$R_{14}$ is $C_1$-$C_{12}$alkyl, methylphenyl or phenyl;

$R_{20}$ is $C_2$-$C_{10}$alkylene; $C_4$-$C_{50}$alkylene which is interrupted by O, phenylene or a -phenylene-X-phenylene- group, in which X is —O—, —S—, —$SO_2$—, —$CH_2$— or —$C(CH_3)_2$—;

$R_{21}$ is $C_2$-$C_{10}$alkylene, $C_2$-$C_{10}$oxaalkylene, $C_2$-$C_{10}$thiaalkylene, $C_6$-$C_{12}$arylene or $C_2$-$C_6$alkenylene;

$R_{22}$ is $C_2$-$C_{10}$alkylene, phenylene, tolylene, diphenylenemethane or a $$\text{cyclohexyl with } CH_3, CH_3, CH_3, CH_2\text{— substituents}$$

group; and $R_{23}$ is $C_2$-$C_{10}$alkylene or $C_4$-$C_{20}$alkylene which is interrupted by O.

Halogen is in all cases fluorine, chlorine, bromine or iodine.

Examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl.

Examples of alkoxy having up to 12 carbon atoms are methoxy, ethoxy, propoxy, isopropoxy, butoxy, isobutoxy, pentoxy, isopentoxy, hexoxy, heptoxy, octoxy, decyloxy, dodecyloxy.

Examples of alkenoxy are propenyloxy, butenyloxy, pentenyloxy and hexenyloxy.

Examples of $C_5$-$C_{12}$cycloalkyl are cyclopentyl, cyclohexyl, cycloheptyl, cyclooctyl and cyclododecyl. $C_5$-$C_8$Cycloalkyl, especially cyclohexyl, is preferred.

$C_{1-4}$Alkyl-substituted $C_5$-$C_{12}$cycloalkyl is for example methylcyclohexyl or dimethylcyclohexyl.

OH— and/or $C_1$-$C_{10}$alkyl-substituted phenyl is for example methylphenyl, dimethylphenyl, trimethylphenyl, tert-butylphenyl or 3,5-di-tert-butyl-4-hydroxyphenyl.

Alkoxy-substituted phenyl is for example methoxyphenyl dimethoxyphenyl or trimethoxyphenyl.

Examples of $C_7$-$C_9$phenylalkyl are benzyl and phenylethyl.

$C_7$-$C_9$Phenylalkyl which is substituted on the phenyl radical by —OH and/or by alkyl having up to 10 carbon atoms is for example methylbenzyl, dimethylbenzyl, trimethylbenzyl, tert-butylbenzyl or 3,5-di-tert-butyl-4-hydroxybenzyl.

Examples of alkenyl are allyl, 2-methallyl, butenyl, pentenyl and hexenyl. Allyl is preferred. The carbon atom in position 1 is preferably saturated.

Examples of alkylene are methylene, ethylene, propylene, trimethylene, tetramethylene, pentamethylene, 2,2-dimethyltrimethylene, hexamethylene, trimethylhexamethylene, octamethylene and decamethylene.

Examples of alkenylene are butenylene, pentenylene and hexenylene.

$C_6$-$C_{12}$ arylene is preferably phenylene.

Alkyl interrupted by O is for example —$CH_2$—$CH_2$—O—$CH_2$—$CH_3$, —$CH_2$—$CH_2$—O—$CH_3$— or —$CH_2$—$CH_2$—O—$CH_2$—$CH_2$—$CH_2$—O—$CH_2$—$CH_3$—. It is preferably derived from polyethlene glycol. A general description is —$((CH_2)_a$—$O)_b$—H/$CH_3$, wherein a is a number from 1 to 6 and b is a number from 2 to 10.

$C_2$-$C_{10}$ oxaalkylene and $C_2$-$C_{10}$thiaalkylene can be deduced from the above mentioned alkylene groups by substituting one or more carbon atoms by an oxygen atom or a sulphur atom.

For instance the hydroxyphenyl triazine UV-absorbers are 2-(2-hydroxyphenyl)-1,3,5-triazines are for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine and 2-(2-hydroxy-4-(2-ethylhexyl)oxy)phenyl-4,6-di(4-phenyl)phenyl-1,3,5-triazine.

Specific hydroxyphenyl triazine UV-absorbers are, for example, those according to following formulae:

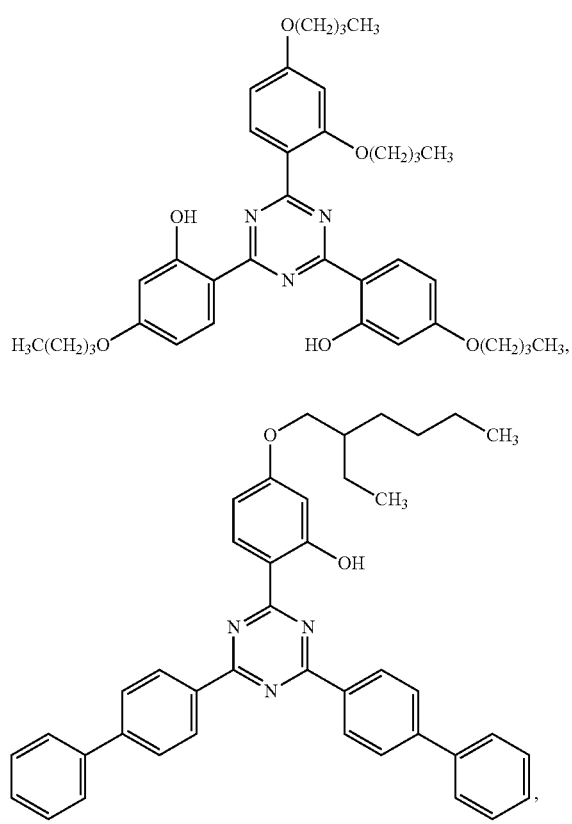
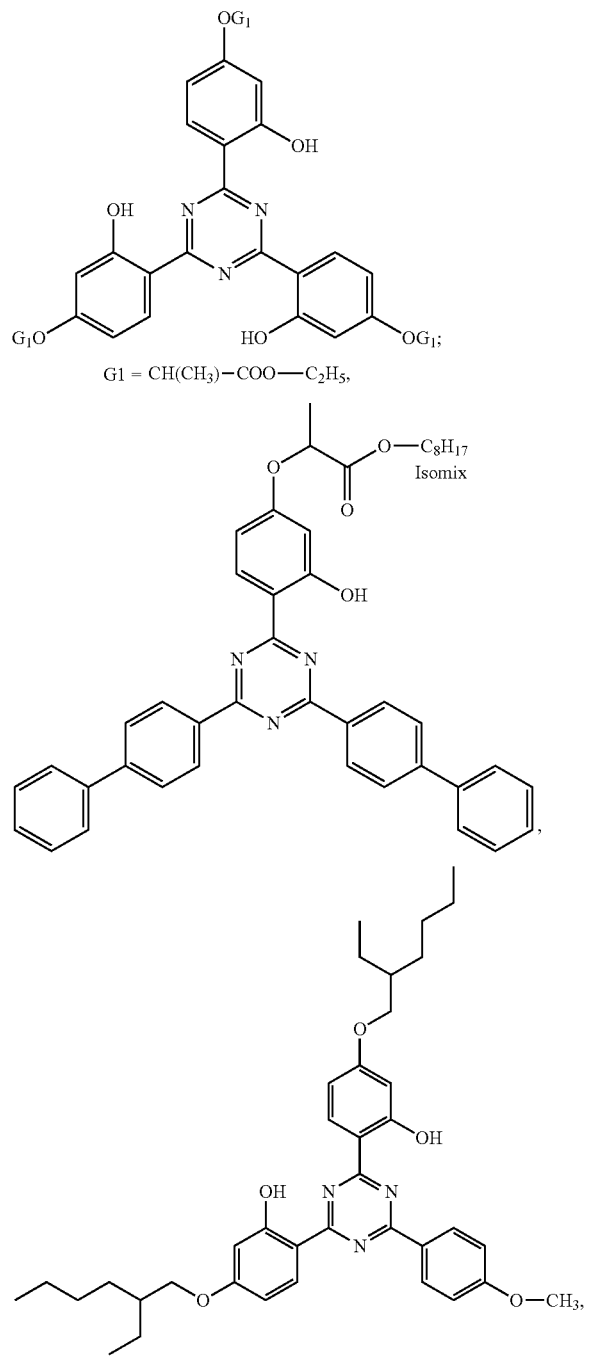
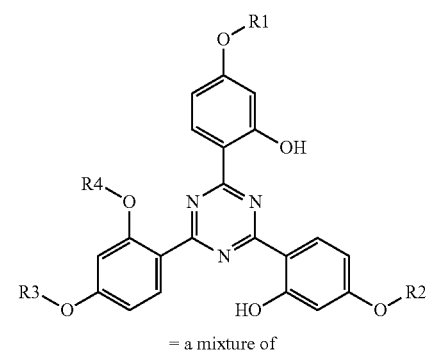
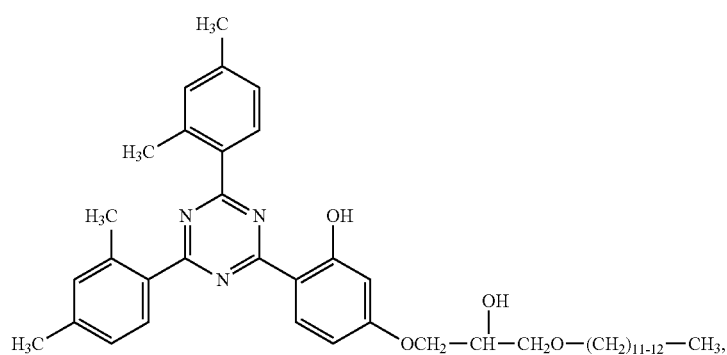

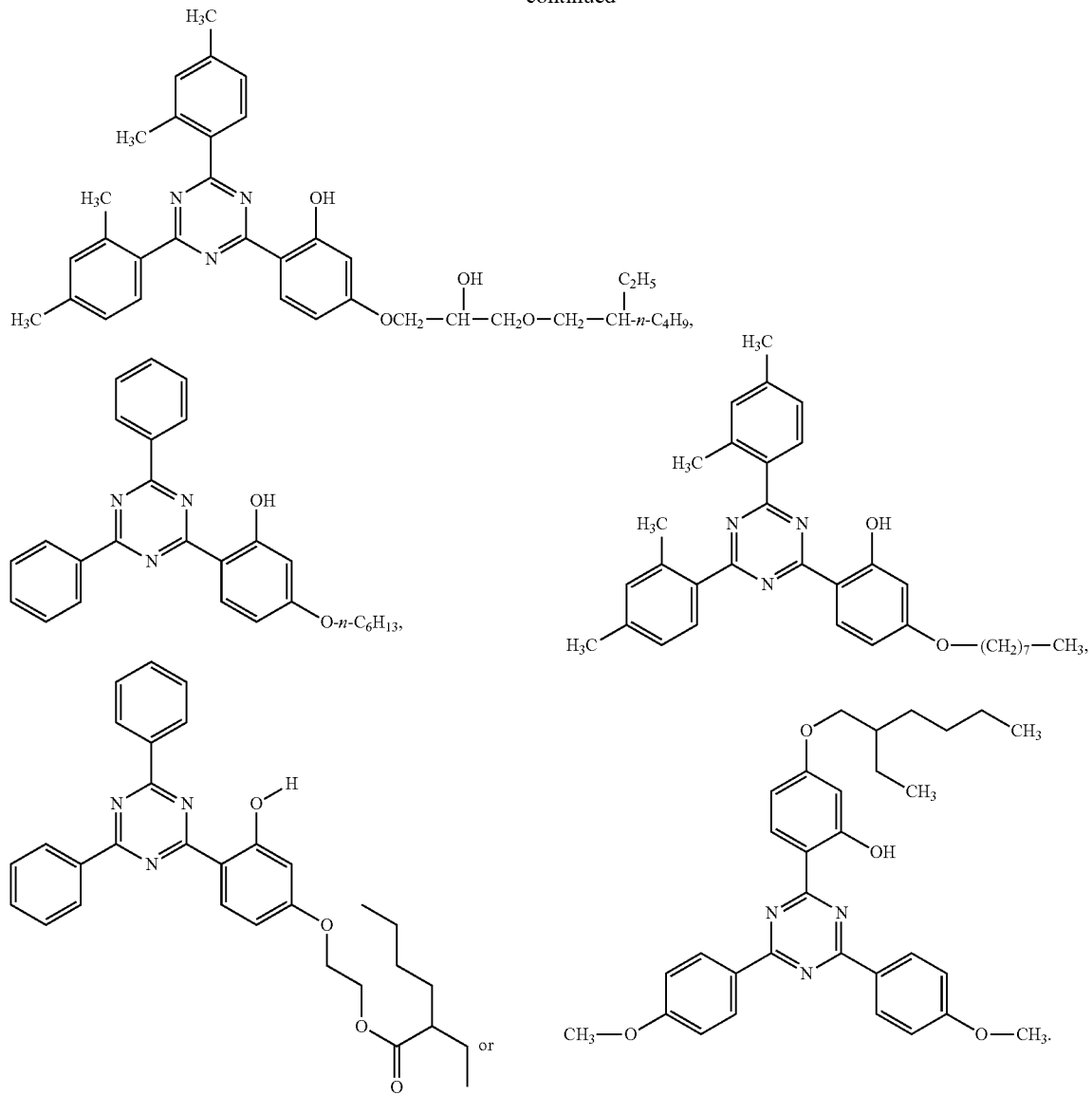

The hydroxyphenyl triazine UV-absorbers are known and partially items of commerce. They are for example disclosed in WO 96/28431.

Specific examples of 2-hydroxybenzophenones are for example the 4-hydroxy, 4-methoxy, 4-octyloxy, 4-decyloxy, 4-dodecyloxy, 4-benzyloxy and 2'-hydroxy-4,4'-dimethoxy derivatives.

Specific examples of 2-(2'-hydroxyphenyl)benzotriazoles are for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

[R—CH₂CH₂—COO—CH₂CH₂]₂— where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5'-(α,α-dimethylbenzyl)-phenyl]benzotriazole.

Specific examples for oxamides are for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

The above mentioned UV-absorbers are largely items of commerce and for example known as Tinuvin® 109, 171, 326, 327, 328, 350, 360, 384, 400, 405, 411 or Chimassorb® 81 from Ciba Specialty Chemicals or Cyasorb® 1164 from Cytech Inc.

In many cases it may be of advantage to use a combination of UV-absorbers from different classes, such as for example a benzophenone UV-absorber with a benzotriazole UV-absorber or a hydroxyphenyltriazine UV-absorber with a benzotriazole UV-absorber. If such a combination is used, the weight ratio between both UV-absorbers is for example from 1:5 to 5:1, for instance from 1:3 to 3:1, particularly 1:1.5 to 1.5:1.

For example the sterically hindered amines are selected from the group consisting of bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine and the compound of example 2 of U.S. Pat. No. 6,117,995.

The sterically hindered amine compounds are preferably selected from the group consisting of the following commercial products:
DASTIB 845®, TINUVIN 770®, TINUVIN 765®, TINUVIN 144®, TINUVIN 123®, TINUVIN 371®, TINUVIN 111®, TINUVIN 783®, TINUVIN 791®, MARK LA 52®, MARK LA 57®, MARK LA 62®, MARK LA 67®, HOSTAVIN N 20®, HOSTAVIN N 24®, SANDUVOR3050®, DIACETAM 5®, SUMISORB TM 61®, UVINUL 4049®, SANDUVOR PR 31®, GOODRITE UV 3034 ®, GOODRITE UV 3150®, GOODRITE UV 3159®, GOODRITE 3110×128®, UVINUL 4050 H®, CHIMASSORB 944®, CHIMASSORB 2020®, CYASORB UV 3346®, CYASORB UV 3529®, DASTIB 1082®, CHIMASSORB 119®, UVASIL 299®, UVASIL 125®, UVASIL 2000®, UVINUL 5050 H®, LICHTSCHUTZSTOFF UV 31®, LUCHEM HA B 18®, MARK LA 63®, MARK LA 68®, UVASORB HA 88®, TINUVIN 622®, HOSTAVIN N 30® and FERRO AM 806®.

Particularly preferred are TINUVIN 770®, TINUVIN 371®, TINUVIN 791®, TINUVIN 622®, TINUVIN 783®, CHIMASSORB 944®, CHIMASSORB 2020® and CHIMASSORB 119®.

For instance the tertiary amines are compounds of formulae (a) to (j)

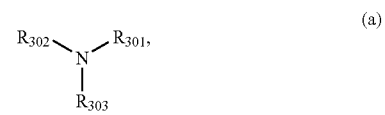

(a)

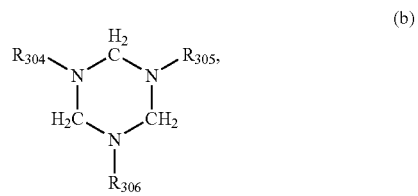

(b)

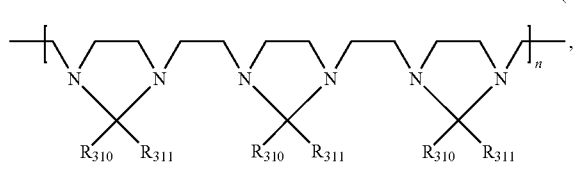

(c)

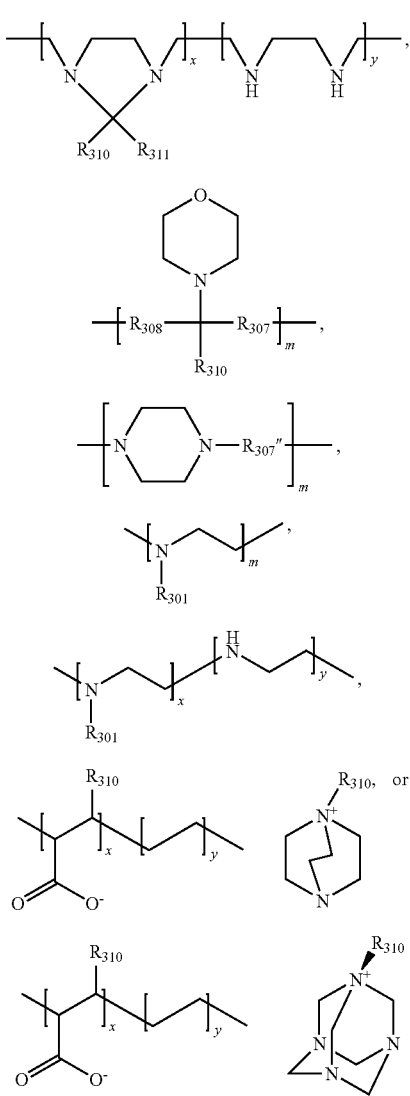

wherein $R_{301}$, $R_{302}$ and $R_{303}$ are independently $C_{10}$-$C_{36}$alkyl;
$R_{304}$, $R_{305}$ and $R_{306}$ are independently $C_9$-$C_{36}$alkyl;
$R_{310}$ and $R_{311}$ are independently hydrogen or $C_1$-$C_{18}$alkyl;
$R_{307}$ and $R_{308}$ are independently $C_1$-$C_8$alkylene;
k is a number from
n is a number from 2 to 20;
m is a number from 4 to 20; and
x, y independently are numbers from 3 to 20.

Preferred are tertiary amines of formula (a).

The tertiary amines are largely items of commerce or can be prepared according to standard methods.

Typically the tertiary amine is present in an amount of 0.1-2%, preferably 0.2-1% by weight, based on the weight of the thermoplastic polymer.

For example, the UV-absorber is present in an amount of 0.01-2% preferably 0.2-2% by weight, based on the weight of the thermoplastic polymer.

For instance, the sterically hindered amine is present in an amount of 0.01-2%, preferably 0.1-1% by weight, based on the weight of the thermoplastic polymer.

Preferably the total amount of tertiary amine, UV-absorber and/or sterically hindered amine is from 0.2 to 4% by weight based on the weight of the thermoplastic polymer.

The stabilized material may additionally also contain various conventional additives, for example:

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)-disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3, 5,3', 5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl) malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl 3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

3. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba-Geigy), tris(nonylphenyl) phosphite,

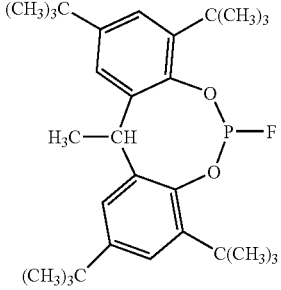

(A)

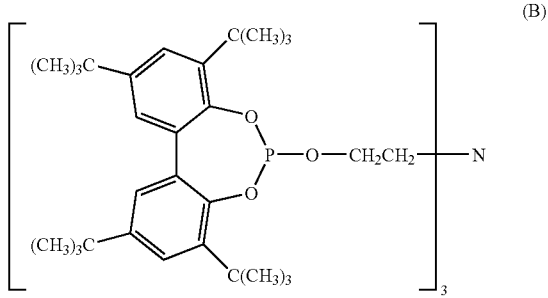

(B)

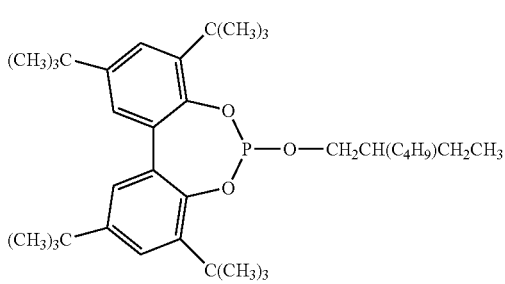

(C)

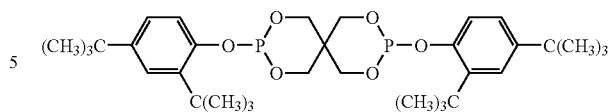

(D)

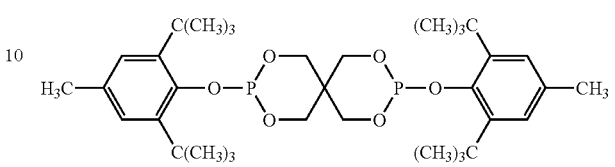

(E)

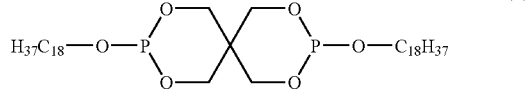

(F)

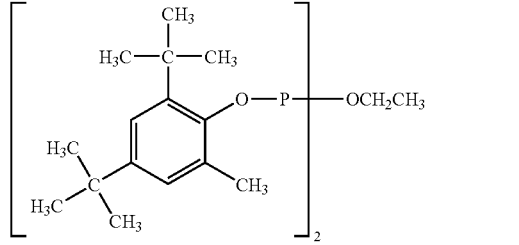

(G)

4. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

5. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

6. Thiosynergists, for example dilauryl thiodipropionate or distearyl thiodipropionate.

7. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

8. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

9. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di (benzylidene)sorbitol.

10. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

11. Other additives, for example plasticisers, lubricants, emulsifiers, pigments, rheology additives, catalysts, flow-control agents, optical brighteners, flameproofing agents, antistatic agents and blowing agents.

12. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The above mentioned further stabilizers and additives are usually applied in an amount from 0.01% to 2%.

Also subject of the invention is a composition as described above which contains additionally a further stabilizer selected from the group consisting of a phenolic antioxidant, a phosphite or phosphonite and a benzofuranone or indolinone.

The above mentioned components and further additives can be incorporated into the thermoplastic polymer to be stabilized by known methods, for example before or during shaping or by applying the dissolved or dispersed compounds to the thermoplastic polymer, if necessary with subsequent evaporation of the solvent. The components can be added to the thermoplastic polymer in the form of a powder, granules or a masterbatch, which contains these components in, for example, a concentration of from 2.5 to 25% by weight.

If desired, the components can be melt blended with each other before incorporation in the thermoplastic polymer. They can also be added to the thermoplastic polymer before or during the polymerization.

The materials stabilized according to this invention can be used in a wide variety of forms, for example as films, fibres, tapes, moulding compositions or profiles.

Examples of processing or transformation of the thermoplastic polymer according to the present invention are:
Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, thermoforming, pipe extrusion, profile extrusion, sheet extrusion, extrusion coating, visbreaking (peroxide, thermal), fiber melt blown, spun bonded, surface treatment (corona discharge, flame, plasma), sterilization (by gamma rays, electron beams), cast polymerization (R&M process, RAM extrusion), gel-coating and tape extrusion.

The compositions are preferably in the form of films useful for packaging, dump, laminating, agriculture and horticulture, greenhouse, mulch, tunnel, silage, bale wrap, swimming pools, waste bags, wallpaper, stretch film, raffia, desalination film, batteries, and connectors.

Of particular interest are agriculture and horticulture applications, such as greenhouses, mulch, tunnels, shading nets, silage and raffia.

Further aspects of the invention are a method for the stabilization of a non halogen containing thermoplastic polymer comprising incorporating into the thermoplastic polymer an aliphatic tertiary amine with a molecular weight greater than 400 g/mol, which is not a 2,2,6,6 tetramethylpiperidine derivative;
a UV-absorber selected from the group consisting of the hydroxyphenyl benzotriazoles, hydroxyphenyl triazines, hydroxy benzophenones and oxalic anilides; or
a light stabilizer from the class of sterically hindered amines;
or a
a mixture of the UV-absorber and the sterically hindered amine;
and
the use of an aliphatic tertiary amine with a molecular weight greater than 400 g/mol, which is not a 2,2,6,6 tetramethylpiperidine derivative; and
a UV-absorber selected from the group consisting of the hydroxyphenyl benzotriazoles, hydroxyphenyl triazines, hydroxy benzophenones and oxalic anilides; or
a light stabilizer from the class of sterically hindered amines;
or a
a mixture of the UV-absorber and the sterically hindered amine for the stabilization of non halogen containing thermoplastic polymers.

Definitions and preferences have already been given; they apply also to the other aspects of the invention.

Polyethylenimines, which have secondary and tertiary amine groups, are also suitable in the sense of the instant invention. Examples for such polyethylenimines are given below.

The following examples illustrate the invention.

A PREPARATION EXAMPLES

Example A1

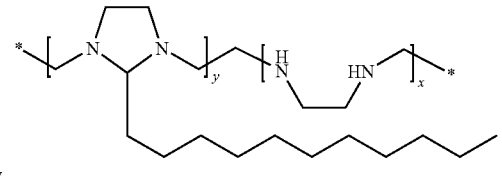

x = y 15.1 g of polyethylenimine (Mw: 800) (0.35 mol of monomer) are dissolved in a 150 ml of iso propyl alcohol; 16.2 g (0.0878 mol) of dodecan aldehyde are dissolved in 50 ml of the same alcohol and are dropped to the previous solution, under inert atmosphere: the reaction is exothermic. The mixture is warmed to boiling and 100 ml of solvent is distilled off. After cooling to room temperature, the mixture is concentrated and 29.7 g of a yellow oil are recovered (y=99%).

$^1$H NMR δ ppm 0.78 (t, 3H); 1-3.5 (m, 38.6H)

Example A2

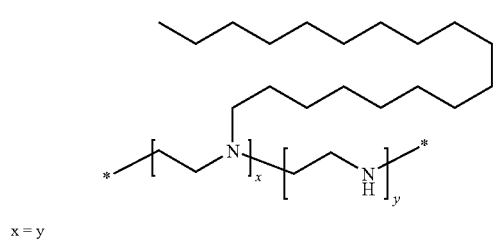

x = y 15.4 g of polyethylenimine (Mw: 800) (0.36 mol of monomer) are dissolved in 200 ml of n-butyl alcohol; a solution of 29.7 g (0.22 mol) of potassium carbonate in 75 ml of water is added to the initial solution. The bi phase system is put under vigorous agitation under nitrogen. At the temperature of 85° C., 59.7 g (0.18 mol) of octadecyl bromide are slowly dropped to the system. After 2 hours under these conditions the mixture is cooled to room temperature and the aqueous layer is separated. The organic phase is concentrated. After the salts precipitate they are filtered off. The solution is concentrated and 58.3 g of yellow solid are obtained (y=96%)

$^1$H NMR δ ppm 0.84 (t, 3H); 1.2 (s, 30.8H); 2.0-3.0 (m, 6.9H)

Example A3

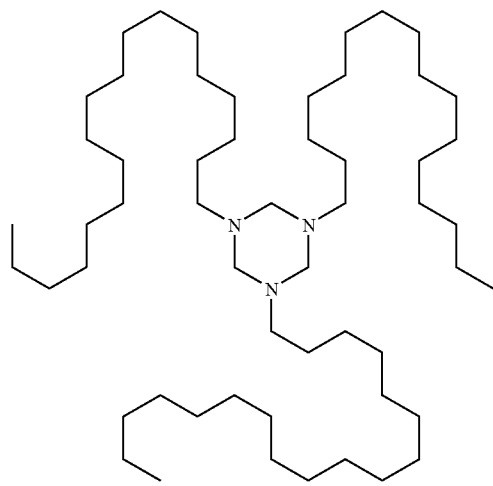

40.0 g of octadecyl amine (0.15 mol) are dissolved in 250 ml of ethyl alcohol and 30 ml of water. The mixture is put under agitation and 5.3 g (0.18 mol) of p-formaldehyde are added, then the system is warmed to 75° C. for 4 hours. After cooling to room temperature a solid precipitate is obtained, it is filtered and dried at 90° C. 40.7 g of wet solid (97%) are yielded.

$^1$H NMR δ ppm 0.86 (t, 3H); 1.0-1.5 (m, 29.6H); 2.37 (t, 1.8H); 3.3 (s, 1.8H)

Example A4

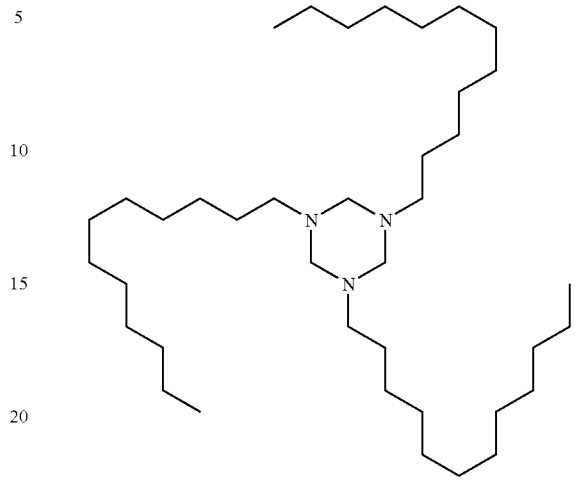

40.0 g of dodecane amine (0.22 mol) are dissolved in 200 ml of ethyl alcohol and 50 ml of water. The mixture is put under agitation and 7.8 g (0.26 mol) of p-formaldehyde are added, then the system is warmed to 75° C. for 4 hours. The mixture is concentrated and 150 ml of solvent are distilled off, 200 ml of n hexane are added and the phases are separated. The hydrocarburic phase is concentrated and 42.5 g of a yellow oil is obtained (99%).

$^1$H NMR δ ppm 0.84 (t, 3H); 1.0-1.5 (m, 20.8H); 2.37 (t, 2.0H); 3.3 (s, 1.8H)

Example A5

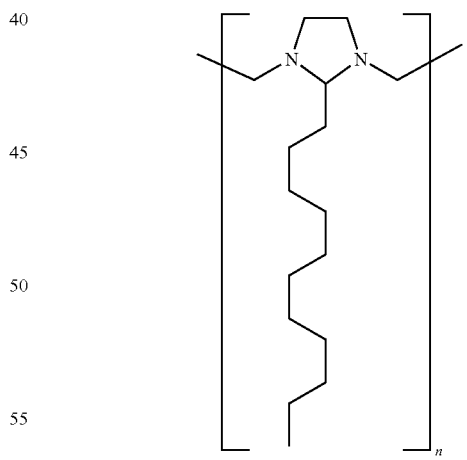

10.0 g of polyethylenimine (Mw: 800) (0.23 mol of monomer) are dissolved in a 100 ml of iso propyl alcohol; 21.4 g (0.12 mol) of dodecane aldehyde are added to the previous solution, under inert atmosphere: the reaction is exothermic. The mixture is warmed to boiling and 70 ml of solvent is distilled off. After cooling to room temperature, the mixture is concentrated and 29.1 g of a yellow oil are recovered (99%).

$^1$H NMR δ ppm 0.80 (t, 3H); 1.2 (s, 19.5H); 2.0-3.2 (m, 9.2H)

Example A6

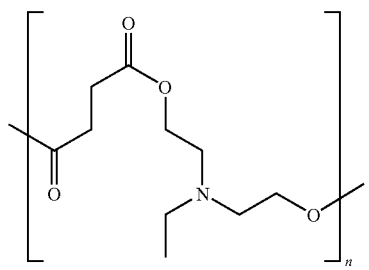

20.0 g of N ethyl-di-ethanol amine (0.15 mol) are suspended in 20 ml of xylene and 21.9 g of di-methyl succinate are added. The mixture is heated to boiling temperature and some solvent is distilled off. After cooling 0.3 g of t-butylate of potassium are added as a catalyst, and the mixture is heated to 150° C. under a current of nitrogen for 2.5 h, then the temperature is raised to 180° C. for 4 h. after cooling the mixture is diluted with toluene and washed with water, the organic phase is separated, dried and concentrated. 26.1 g of a brown oil are obtained (81%).

$^1$H NMR δ ppm 1.0 (t, 3H); 2.6 (s, 6.0H); 2.7 (t, 4.0H); 4.1 (t, 4.0H)

Example A7

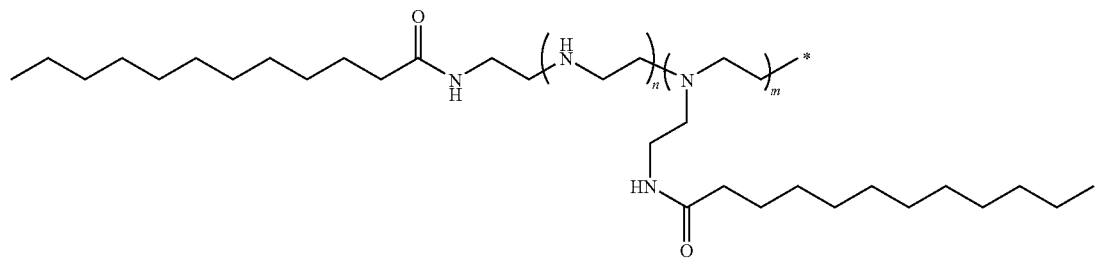

20.0 g of polyethyleneimine and 10.1 g of methyl laurylate are put in a one neck flask of 50 ml and heated to at 185° C. at atmospheric pressure for one hour. The pressure is reduced to 1 mm Hg at the same temperature. After cooling to room temperature 28.4 g of a yellow oil is recovered (99%).

$^1$H NMR δ ppm 0.8 (t, 3H); 1.1 (s, 16.0H); 1.5 (s, 11.3H); 2.0-3.6 (m, 40.9H)

B APPLICATION EXAMPLES

Example B1

LDPE (Riblene FF29 from Polimeri Europa) blown extruded films are prepared and exposed in an Atlas Weather O Meter (WOM dry) and in a Q-UV weathering device. To simulate the environmental exposure to sulphur, each film was previously exposed to elemental sulphur vapour.

Before measuring the UVA degradation the films were washed with water in order to remove the sulphur. The degradation of UV absorber was monitored by UV-visible spectroscopy and calculated from the transmittance in the region 280-380 nm. The polymer matrix degradation was followed by carbonyl increment using FT-IR spectroscopy.

The results are presented in Tables 1-4.

TABLE 1 carbonyl increment after WOM exposure of sulphur treated LDPE films containing various additives

| Sample | Additive content | 0 hours | 217 hours | 462 hours | 770 hours | 1090 hours | 1280 hours |
|---|---|---|---|---|---|---|---|
| 1 | 0.2% UVA 1 comparative | 0 | 0.276 | 0.49 | 0.792 | 1.213 | 1.636 |
| 2 | 0.2% UVA 1, 0.6% TDA | 0 | 0.055 | 0.243 | 0.566 | 0.89 | 1.258 |
| 3 | 0.2% UVA 1, 0.3% HALS 1 comparative | 0 | 0.104 | 0.299 | 0.598 | 0.915 | 1.319 |
| 4 | 0.2% UVA 1, 0.6% TDA, 0.3% HALS 1 | 0 | 0.052 | 0.121 | 0.323 | 0.604 | 0.92 |

Table 1 shows the carbonyl increment and surprisingly the formulations 2 and 3 look very similar although 2 does not contain HALS.

TABLE 2 residue transmittance %(280-380 nm) after WOM exposure of sulphur treated films

| Sample | Additive content | 0 hours | 217 hours | 462 hours | 770 hours | 1090 hours |
|---|---|---|---|---|---|---|
| 1 | 0.2% UVA 1 comparative | 6.83 | 33.54 | 37.26 | 31.33 | 27.67 |
| 2 | 0.2% UVA 1, 0.6% TDA | 6.46 | 5.16 | 35.49 | 31 | 28.7 |
| 3 | 0.2% UVA 1, 0.3% NOR 371 comparative | 5.92 | 16.34 | 32.95 | 27.59 | 28.92 |
| 4 | 0.2% UVA 1, 0.6% TDA, 0.3% HALS 1 | 7.32 | 6.11 | 7.54 | 20.21 | 31.54 |

Table 2 shows the transmittance in the range 280-380 nm of films treated with sulphur and exposed in WOM. As can be seen the transmittance of tridodecylamine containing remains low for longer time due to less degradation of the UV absorber.

TABLE 3

Carbonyl increment of Q-UV exposed films (no sulphur treatment)

| Sample | Additive content | 0 hours | 265 hours | 395 hours | 497 hours | 736 hours |
|---|---|---|---|---|---|---|
| 1 | 0.2% UVA 1 comparative | 0 | 0 | 0.2 | 0.32 | 0.751 |
| 2 | 0.2% UVA 1, 0.6% TDA | 0 | 0 | 0 | 0.032 | 0.047 |
| 3 | 0.2% UVA 1, 0.3% HALS 1 comparative | 0 | 0 | 0 | 0.02 | 0.018 |
| 4 | 0.2% UVA 1, 0.6% TDA, 0.3% HALS 1 | 0 | 0 | 0 | 0.014 | 0.014 |

TABLE 4

Residue elongation % of Q-UV exposed films (no sulphur treatment)

| Sample | Additive content | 0 hours | 265 hours | 395 hours | 497 hours |
|---|---|---|---|---|---|
| 1 | 0.2% UVA 1 comparative | 100 | 93 | 66 | 32 |
| 2 | 0.2% UVA 1, 0.6% TDA | 100 | 91 | 92 | 81 |
| 3 | 0.2% UVA 1, 0.3% HALS 1 comparative | 100 | 90 | 94 | 97 |
| 4 | 0.2% UVA 1, 0.6% TDA, 0.3% HALS 1 | 100 | 105 | 99 | 95 |

Tables 3 and 4 respectively show the carbonyl increment and the residue elongation of films exposed in Q-UV without the sulphur contamination.

As can be clearly seen the combination of tridodecylamine (TDA) and UVA 1 is able to give certain stabilization to the films also in absence of sulphur.

Example B2

Further compositions have been prepared according to example 1 and the carbonyl increment after WOM exposure has been determined. The results are given in Table 1 and 2

TABLE 1 carbonyl increment after WOM exposure of sulphur coated films.

| Sample No | Additives | 0 hours | 310 hours | 595 hours |
|---|---|---|---|---|
| 1 | No additives | 0 | 0.348 | 0.732 |
| 2 | 0.2% UVA 1 | 0 | 0.369 | 0.831 |
| 3 | 0.3% Tinuvin 327 | 0 | 0.118 | 0.265 |
| 4 | 0.3% TDA | 0 | 0.363 | 0.757 |
| 5 | 0.6% TDA | 0 | 0.348 | 0.746 |
| 6 | 0.9% TDA | 0 | 0.337 | 0.74 |
| 7 | 0.2% UVA 1 + 0.3% TDA | 0 | 0.268 | 0.667 |
| 8 | 0.2% UVA 1 + 0.6% TDA | 0 | 0.041 | 0.359 |
| 9 | 0.3% Tinuvin 327 + 0.3% TDA | 0 | 0.127 | 0.3 |
| 10 | 0.3% Tinuvin 327 + 0.6% TDA | 0 | 0.031 | 0.179 |

TABLE 2 carbonyl increment after WOM exposure of films.

| Sample No. | Additive | 0 hours | 254 hours | 480 hours |
|---|---|---|---|---|
| 1 | No additives | 0 | 0.135 | 0.336 |
| 2 | 0.2% UVA 1 | 0 | 0.043 | 0.16 |
| 3 | 0.3% Tinuvin 327 | 0 | 0.034 | 0.124 |
| 4 | 0.3% TDA | 0 | 0.01 | 0.02 |
| 5 | 0.6% TDA | 0 | 0.011 | 0.026 |
| 6 | 0.9% TDA | 0 | 0.016 | 0.026 |
| 7 | 0.2% UVA 1 + 0.3% TDA | 0 | 0.006 | 0.023 |
| 8 | 0.2% UVA 1 + 0.6% TDA | 0 | 0.004 | 0.018 |
| 9 | 0.3% Tinuvin 327 + 0.3% TDA | 0 | 0.007 | 0.019 |
| 10 | 0.3% Tinuvin 327 + 0.6% TDA | 0 | 0 | 0.01 |

Example B3

LDPE films are prepared according to example B1, the amine used is a branched polyethylenimine (PEI) (Mw: 15000), a polymeric structure bearing both secondary and tertiary amines. Table 1 below shows the time until 50% of retained tensile elongation are reached (T50). The samples are treated with sulphur and exposed to WOM.

TABLE 1

| Sample No. | Additives | T50 (hours) |
|---|---|---|
| 1 | 0.3% HALS 1, 0.2% UVA 1 | 500 |
| 2 | 0.3% HALS 1, 0.2% UVA 1, 0.1% PEI | 542 |
| 3 | 0.3% HALS 1, 0.2% UVA 1, 0.2% PEI | 907 |
| 4 | 0.3% HALS 1, 0.2% UVA 1, 0.3% PEI | 909 |
| 5 | 0.3% HAS 1, 0.2% UVA 1, 0.6% PEI | 980 |

Example B4

Some LDPE films were prepared according to example B1, the used amines are commercial products of Akzo Nobel (Table 1). Table 2 below shows the time until 50% of retained tensile elongation are reached (T50). The samples are treated with sulphur and exposed to WOM.

TABLE 1

| Tested Amines | | |
|---|---|---|
| Commercial name | Abbreviation | |
| Armeen 316 | A 316 | Trihexadecylamine |
| Armeen M2HT | A M2HT | Di(hydrogenated tallow methylamine) |
| Ethoduomeen T/13 | E T/13 | Special tallow diamine ethoxylated |

TABLE 2

| Sample No. | Additives | T50 (hours) |
|---|---|---|
| 1 | 0.3% HALS 1, 0.2% UVA 1 | 500 |
| 2 | 0.6% HALS 1, 0.2% UVA 1 | 647 |
| 3 | 0.3% HALS 1, 0.2% UVA 1, 0.6% A 316 | 828 |
| 4 | 0.3% HALS 1, 0.2% UVA 1, 0.6% A M2HT | 919 |
| 5 | 0.3% HALS 1, 0.2% UVA 1, 0.6% E T/13 | 819 |

Stabilizers Used:
TDA is tridodecylamine
UVA 1 is

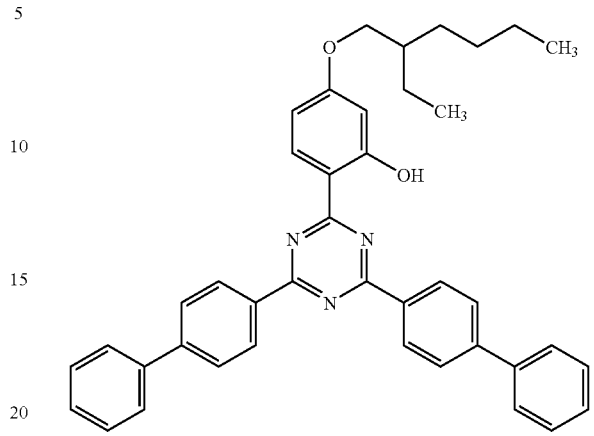

HALS 1 is Tinvuin® NOR371, which is described in U.S. Pat. No. 6,117,995.
Tinuvin® 327 is a commercial UV Absorber from Ciba Specialty Chemicals.

The invention claimed is:
1. A stabilized polymer composition comprising
a) a non halogen containing thermoplastic polymer;
b) an aliphatic tertiary amine with a molecular weight greater than 400 g/mol, which is not a 2,2,6,6 tetramethylpiperidine derivative; and
c1) a UV-absorber selected from the group consisting of hydroxyphenyl benzotriazoles, hydroxyphenyl triazines, hydroxy benzophenones and oxalic anilides; or
c2) a light stabilizer selected from sterically hindered amines; or
c3) a mixture of the UV-absorber, component c1) and the sterically hindered amine, component c2)
and
wherein the tertiary amine is a compound of formula (a), (b), (c), (d), (e), (f), (g), (h), (i) or (j)

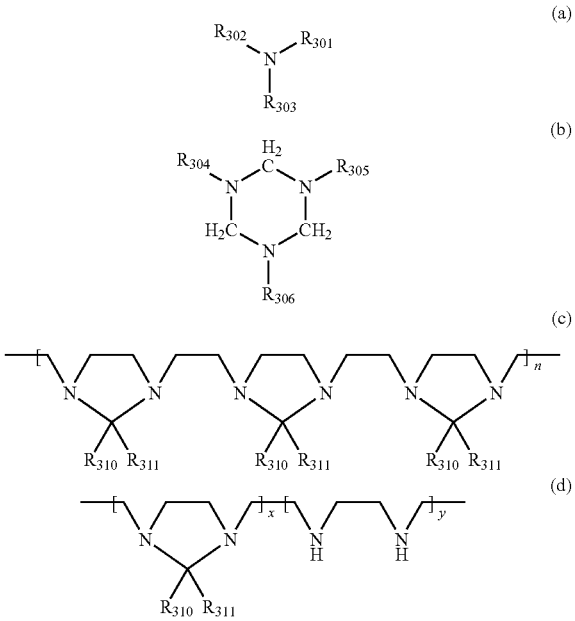

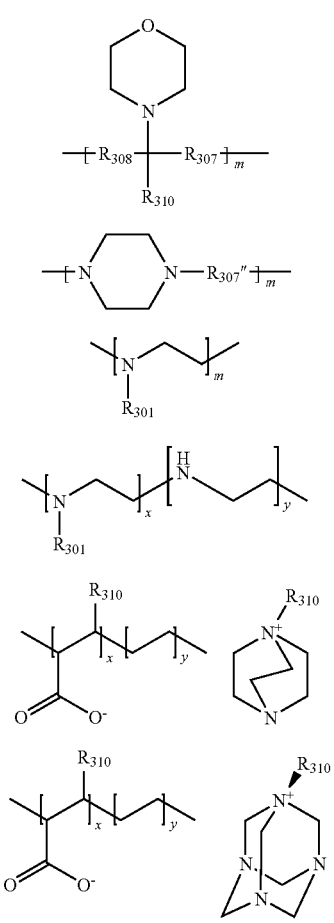

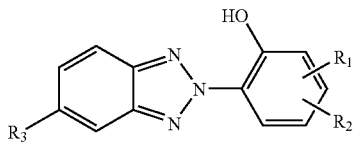

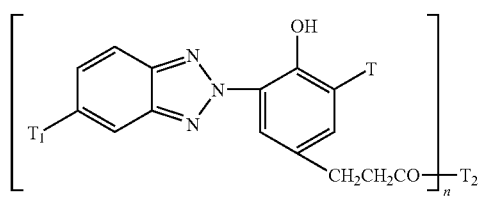

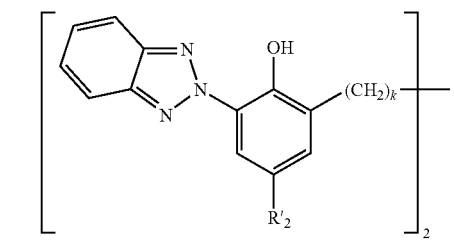

wherein $R_{301}$, $R_{302}$ and $R_{303}$ are independently $C_{10}$-$C_{36}$alkyl;

$R_{304}$, $R_{305}$ and $R_{306}$ are independently $C_9$-$C_{36}$alkyl;

$R_{310}$ and $R_{311}$ are independently hydrogen or $C_1$-$C_{18}$alkyl;

$R_{307}$ and $R_{308}$ are independently $C_1$-$C_8$alkylene;

n is a number from 2 to 20;

m is a number from 4 to 20; and x, y independently are numbers from 3 to 20.

2. A composition according to claim 1 wherein the thermoplastic polymer is low density polyethylene, linear low density polyethylene, polypropylene or ethylvinylacetate.

3. A composition according to claim 1, which is in the form of a film or tape.

4. A composition according to claim 1 wherein the hydroxybenzophenone is of formula I;

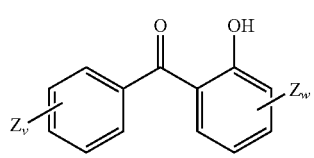

the 2-hydroxyphenylbenzotriazole is of formula IIa, IIb or IIc;

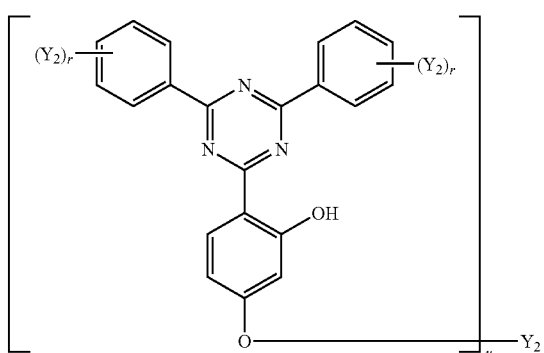

the 2-hydroxyphenyltriazine is of formula III;

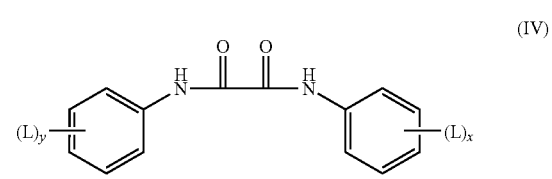

and
the oxanilide is of formula (IV);

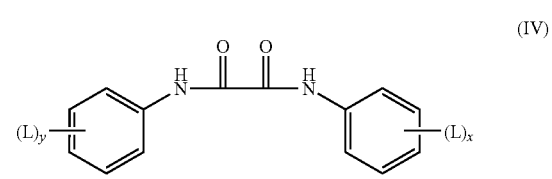

wherein
in the compounds of the formula (I)
v is an integer from 1 to 3 and w is 1 or 2 and the substituents Z independently of one another are hydrogen, halogen, hydroxyl or alkoxy having 1 to 12 carbon atoms;
in the compounds of the formula (IIa),
$R_1$ is hydrogen, alkyl having 1 to 24 carbon atoms, phenylalkyl having 1 to 4 carbon atoms in the alkyl moiety, cycloalkyl having 5 to 8 carbon atoms or a radical of the formula

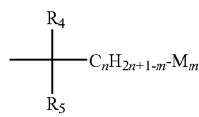

in which
R$_4$ and R$_5$ independently of one another are alkyl having in each case 1 to 5 carbon atoms, or R$_4$, together with the radical C$_n$H$_{2n+1-m}$, forms a cycloalkyl radical having 5 to 12 carbon atoms, m is 1 or 2, n is an integer from 2 to 20 and M is a radical of the formula —COOR$_6$ in which R$_6$ is hydrogen, alkyl having 1 to 12 carbon atoms, alkoxyalkyl having in each case 1 to 20 carbon atoms in the alkyl moiety and in the alkoxy moiety or phenylalkyl having 1 to 4 carbon atoms in the alkyl moiety, R$_2$ is hydrogen, halogen, alkyl having 1 to 18 carbon atoms or phenylalkyl having 1 to 4 carbon atoms in the alkyl moiety, and R$_3$ is hydrogen, chlorine, alkyl or alkoxy having in each case 1 to 4 carbon atoms or —COOR$_6$ in which R$_6$ is as defined above, at least one of the radicals R$_1$ and R$_2$ being other than hydrogen;

in the compounds of the formula (IIb)

T is hydrogen or alkyl having 1 to 6 carbon atoms,

T$_1$ is hydrogen, chlorine or alkyl or alkoxy having in each case 1 to 4 carbon atoms, n is 1 or 2 and, if n is 1, T$_2$ is chlorine or a radical of the formula —OT$_3$ or

and, if n is 2, T$_2$ is a radical of the formula

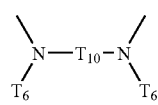

or —O-T$_9$-O—;

in which

T$_3$ is hydrogen, alkyl which has 1 to 18 carbon atoms and is unsubstituted or substituted by 1 to 3 hydroxyl groups or by —OCOT$_6$, alkyl which has 3 to 18 carbon atoms, is interrupted once or several times by —O— or —NT$_6$- and is unsubstituted or substituted by hydroxyl or —OCOT$_6$, cycloalkyl which has 5 to 12 carbon atoms and is unsubstituted or substituted by hydroxyl and/or alkyl having 1 to 4 carbon atoms, alkenyl which has 2 to 18 carbon atoms and is unsubstituted or substituted by hydroxyl, phenylalkyl having 1 to 4 carbon atoms in the alkyl moiety, or a radical of the formula —CH$_2$CH(OH)-T$_7$or

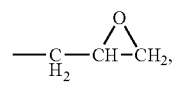

T$_4$ and T$_5$ independently of one another are hydrogen, alkyl having 1 to 18 carbon atoms, alkyl which has 3 to 18 carbon atoms and is interrupted once or several times by —O— or —NT$_6$-, cycloalkyl having 5 to 12 carbon atoms, phenyl, phenyl which is substituted by alkyl having 1 to 4 carbon atoms, alkenyl having 3 to 8 carbon atoms, phenylalkyl having 1 to 4 carbon atoms in the alkyl moiety or hydroxyalkyl having 2 to 4 carbon atoms, T$_6$ is hydrogen, alkyl having 1 to 18 carbon atoms, cycloalkyl having 5 to 12 carbon atoms, alkenyl having 3 to 8 carbon atoms, phenyl, phenyl which is substituted by alkyl having 1 to 4 carbon atoms or phenylalkyl having 1 to 4 carbon atoms in the alkyl moiety, T$_7$ is hydrogen, alkyl having 1 to 18 carbon atoms, phenyl which is unsubstituted or substituted by hydroxyl, phenylalkyl having 1 to 4 carbon atoms in the alkyl moiety, or —CH$_2$OT$_8$, T$_8$ is alkyl having 1 to 18 carbon atoms, alkenyl having 3 to 8 carbon atoms, cycloalkyl having 5 to 10 carbon atoms, phenyl, phenyl which is substituted by alkyl having 1 to 4 carbon atoms, or phenylalkyl having 1 to 4 carbon atoms in the alkyl moiety, T$_9$ is alkylene having 2 to 8 carbon atoms, alkenylene having 4 to 8 carbon atoms, alkynylene having 4 carbon atoms, cyclohexylene, alkylene which has 2 to 8 carbon atoms and is interrupted once or several times by —O—, or a radical of the formula —CH$_2$CH(OH)CH$_2$OT$_{11}$OCH$_2$CH(OH)CH$_2$— or —CH$_2$—C(CH$_2$OH)$_2$—CH$_2$—, T$_{10}$ is alkylene which has 2 to 20 carbon atoms and can be interrupted once or several times by —O—, or cyclohexylene, and T$_{11}$ is alkylene having 2 to 8 carbon atoms, alkylene which has 2 to 18 carbon atoms and is interrupted once or several times by —O—, 1,3-cyclohexylene, 1,4-cyclohexylene, 1,3-phenylene or 1,4-phenylene, or T$_{10}$ and T$_6$, together with the two nitrogen atoms, are a piperazine ring;

in the compounds of formula (IIc)

R'$_2$ is C$_1$-C$_{12}$alkyl and k is a number from 1 to 4;

in the compounds of the formula (III)

u is 1 or 2 and r is an integer from 1 to 3, the substituents

Y$_1$ independently of one another are hydrogen, hydroxyl, phenyl or halogen, halogenomethyl, alkyl having 1 to 12 carbon atoms, alkoxy having 1 to 18 carbon atoms or alkoxy having 1 to 18 carbon atoms which is substituted by a group —COO(C$_1$-C$_{18}$alkyl);

if u is 1,

Y$_2$ is alkyl having 1 to 18 carbon atoms, phenyl which is unsubstituted or substituted by hydroxyl, halogen, alkyl or alkoxy having 1 to 18 carbon atoms;

alkyl which has 1 to 12 carbon atoms and is substituted by —COON, —COOY$_8$, —CONH$_2$, —CONHY$_9$, —CONY$_9$Y$_{10}$, —NH$_2$, —NHY$_9$, —NY$_9$Y$_{10}$, —CN and/or —OCOY$_{11}$;

alkyl which has 4 to 20 carbon atoms, is interrupted by one or more oxygen atoms and is unsubstituted or substituted by hydroxyl or alkoxy having 1 to 12 carbon atoms, alkenyl having 3 to 6 carbon atoms, glycidyl, cyclohexyl which is unsubstituted or substituted by hydroxyl, alkyl having 1 to 4 carbon atoms and/or —OCOY$_{11}$, phenylalkyl which has 1 to 5 carbon atoms in the alkyl moiety and is unsubstituted or substituted by hydroxyl, chlorine and/or methyl, —COY$_{12}$ or —SO$_2$Y$_{13}$, or, if u is 2, Y$_2$ is alkylene having 2 to 16 carbon atoms, alkenylene having 4 to 12 carbon atoms, xylylene, alkylene which has 3 to 20 carbon atoms, is interrupted by one or more —O— atoms and/or is substituted by hydroxyl, —CH$_2$CH(OH)CH$_2$—O—Y$_{15}$—OCH$_2$CH(OH)CH$_2$, —CO—NH—Y$_{17}$—NH—CO— or —(CH$_2$)$_m$—CO$_2$—Y$_{18}$—OCO—(CH$_2$)$_m$, in which m is 1, 2 or 3, Y$_8$ is alkyl having 1 to 18 carbon atoms, alkenyl having 3 to 18 carbon atoms, alkyl which has 3 to 20 carbon atoms, is interrupted by one or more oxygen or sulfur atoms or —NT$_6$- and/or is substituted by hydroxyl, alkyl which has 1 to 4 carbon atoms and is substituted by —P(O)(OY$_{14}$)$_2$, —NY$_9$Y$_{10}$ or —OCOY$_{11}$ and/or hydroxyl, alkenyl having 3 to 18 carbon atoms, glycidyl, or phenylalkyl having 1 to 5 carbon atoms in the alkyl moiety, Y$_9$ and Y$_{10}$ independently of one another are alkyl having 1 to 12 carbon atoms, alkoxyalkyl having 3 to 12 carbon atoms, dialkylaminoalkyl having 4 to 16 carbon atoms or cyclohexyl having 5 to 12 carbon atoms, or Y$_9$ and Y$_{10}$ together are alkylene, oxaalkylene or azaalkylene having in each case 3 to 9 carbon atoms, Y$_{11}$ is alkyl having 1 to 18 carbon atoms, alkenyl having 2 to 18 carbon atoms or phenyl, Y$_{12}$ is alkyl having 1 to 18 carbon atoms, alkenyl having 2 to 18 carbon atoms, phenyl, alkoxy having 1 to 12 carbon atoms, phenoxy, alkylamino having 1 to 12 carbon atoms or phenylamino, Y$_{13}$ is alkyl having 1 to 18 carbon atoms, phenyl or alkylphenyl having 1 to 8 carbon atoms in the alkyl radical, Y$_{14}$ is alkyl having 1 to 12 carbon atoms or phenyl, Y$_{15}$ is alkylene having 2 to 10 carbon atoms, phenylene or a group -phenylene-M-phenylene- in which M is —O—, —S—, —CH$_2$— or —C(CH$_3$)$_2$—, Y$_{16}$ is alkylene, oxaalkylene or thiaalkylene having in each case 2 to 10 carbon atoms, phenylene or alkenylene having 2 to 6 carbon atoms, Y$_{17}$ is alkylene having 2 to 10 carbon atoms, phenylene or alkylphenylene having 1 to 11 carbon atoms in the alkyl moiety, and Y$_{18}$ is alkylene having 2 to 10 carbon atoms or alkylene which has 4 to 20 carbon atoms and is interrupted once or several times by oxygen; and in the compounds of the formula (IV)

x is an integer from 1 to 3 and the substituents L independently of one another are hydrogen, alkyl, alkoxy or alkylthio having in each case 1 to 22 carbon atoms, phenoxy or phenylthio.

5. A composition according to claim 1 comprising a hydroxyphenyl triazine UV-absorber of formula (IV)

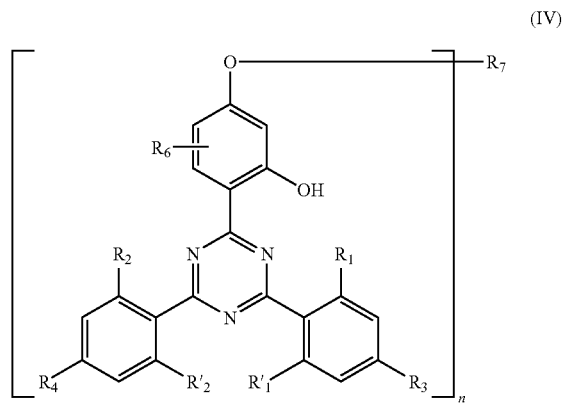

(IV)

in which n is 1 or 2;

R$_1$, R'$_1$, R$_2$ and R'$_2$, independently of one another, are H, OH, C$_1$-C$_{12}$alkyl; C$_2$-C$_6$alkenyl; C$_1$-C$_{12}$alkoxy; C$_2$-C$_{18}$alkenoxy; halogen; trifluoromethyl; C$_7$-C$_{11}$phenylalkyl; phenyl; phenyl which is substituted by C$_1$-C$_{18}$alkyl, C$_1$-C$_{18}$alkoxy or halogen; phenoxy; or phenoxy which is substituted by C$_1$-C$_{18}$alkyl, C$_1$-C$_{18}$alkoxy or halogen;

R$_3$ and R$_4$, independently of one another, are H, C$_1$-C$_{12}$alkyl; OR'$_7$; C$_2$-C$_6$alkenyl; C$_2$-C$_{18}$alkenoxy; halogen; trifluoromethyl; C$_7$-C$_{11}$phenylalkyl; phenyl; phenyl which is substituted by C$_1$-C$_{18}$alkyl, C$_1$-C$_{18}$alkoxy or halogen; phenoxy; or phenoxy which is substituted by C$_1$-C$_{18}$alkyl, C$_1$-C$_{18}$alkoxy or halogen;

R$_6$ is hydrogen, C$_1$-C$_{24}$alkyl, C$_6$-C$_{12}$cycloalkyl or C$_7$-C$_{15}$phenylalkyl;

R$_7$, in the case where n=1, and R'$_7$, independently of one another, are hydrogen or C$_1$-C$_{18}$alkyl; or are C$_1$-C$_{12}$alkyl which is substituted by OH, C$_1$-C$_{18}$alkoxy, allyloxy, halogen, —COOH, —COOR$_8$, —CONH$_2$, —CONHR$_9$, —CON(R$_9$)(R$_{10}$), —NH$_2$, —NHR$_9$, —N(R$_9$)(R$_{10}$), —NHCOR$_{11}$, —CN, —OCOR$_{11}$, phenoxy and/or phenoxy which is substituted by C$_1$-C$_{18}$alkyl, C$_1$-C$_{18}$alkoxy or halogen; or R$_7$ is C$_3$-C$_{50}$alkyl which is interrupted by —O— and may be substituted by OH; or R$_7$ is C$_3$-C$_6$alkenyl; glycidyl; C$_6$-C$_{12}$cycloalkyl; cyclohexyl which is substituted by OH, C$_1$-C$_4$alkyl or —OCOR$_{11}$; C$_7$-C$_{11}$phenylalkyl which is unsubstituted or substituted by OH, Cl or CH$_3$; —CO—R$_{12}$ or —SO$_2$—R$_{13}$;

R$_7$, in the case where n=2, is C$_2$-C$_{16}$alkylene, C$_4$-C$_{12}$alkenylene, xylylene, C$_3$-C$_{20}$alkylene which is interrupted by O and/or substituted by OH, or is a group of the formula —CH$_2$CH(OH)CH$_2$O—R$_{20}$—OCH$_2$CH(OH)CH$_2$—, —CO—R$_{21}$—CO—, —CO—NH—R$_{22}$—NH—CO— or —(CH$_2$)$_m$—COO—R$_{23}$—OOC—(CH$_2$)$_m$—, in which m is a number in the range from 1 to 3, or is

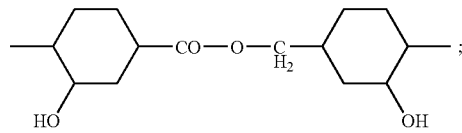

R$_8$ is C$_1$-C$_{18}$alkyl; C$_2$-C$_{18}$alkenyl; hydroxyethyl; C$_3$-C$_{50}$alkyl which is interrupted by O, NH, NR$_9$ or S and/or is substituted by OH; C$_1$-C$_4$alkyl which is substituted by —P(O)(OR$_{14}$)$_2$, —N(R$_9$)(R$_{10}$) or —OCOR$_{11}$ and/or OH; glycidyl; C$_6$-C$_{12}$cycloalkyl; phenyl; C$_7$-C$_{14}$alkylphenyl or C$_7$-C$_{11}$phenylalkyl;

R$_9$ and R$_{10}$, independently of one another, are C$_1$-C$_{12}$alkyl; C$_3$-C$_{12}$alkoxyalkyl; C$_4$-C$_{16}$dialkylaminoalkyl or C$_5$-C$_{12}$cycloalkyl, or R$_9$ and R$_{10}$ together are C$_3$-C$_9$alkylene or -oxaalkylene or -azaalkylene;

R$_{11}$ is C$_1$-C$_{18}$alkyl; C$_2$-C$_{18}$alkenyl or phenyl; C$_2$-C$_{12}$hydroxyalkyl; cyclohexyl; or is C$_3$-C$_{50}$alkyl which is interrupted by —O— and may be substituted by OH;

R$_{12}$ is C$_1$-C$_{18}$alkyl; C$_2$-C$_{18}$alkenyl; phenyl; C$_1$-C$_{18}$alkoxy; C$_3$-C$_{18}$alkenyloxy; C$_3$-C$_{50}$alkoxy which is interrupted by O, NH, NR$_9$ or S and/or substituted by OH; cyclohexyloxy; C$_7$-C$_{14}$alkylphenoxy;

C$_7$-C$_{11}$phenylalkoxy; phenoxy; C$_1$-C$_{12}$alkylamino; phenylamino; tolylamino or naphthylamino;

R$_{13}$ is C$_1$-C$_{12}$alkyl; phenyl; naphthyl or C$_7$-C$_{14}$alkylphenyl;

R$_{14}$ is C$_1$-C$_{12}$alkyl, methylphenyl or phenyl;

R$_{20}$ is C$_2$-C$_{10}$alkylene; C$_4$-C$_{50}$alkylene which is interrupted by O, phenylene or a -phenylene-X-phenylene- group, in which X is —O—, —S—, —SO$_2$—, —CH$_2$— or —C(CH$_3$)$_2$—;

R$_{21}$ is C$_2$-C$_{10}$alkylene, C$_2$-C$_{10}$oxaalkylene, C$_2$-C$_{10}$thiaalkylene, C$_6$-C$_{12}$arylene or C$_2$-C$_6$alkenylene;

R$_{22}$ is C$_2$-C$_{10}$alkylene, phenylene, tolylene, diphenylenemethane or

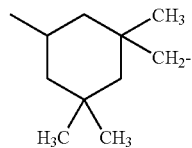

group; and

R$_{23}$ is C$_2$-C$_{10}$alkylene or C$_4$-C$_{20}$alkylene which is interrupted by O.

6. A composition according to claim 1 comprising a UV-absorber of formulae

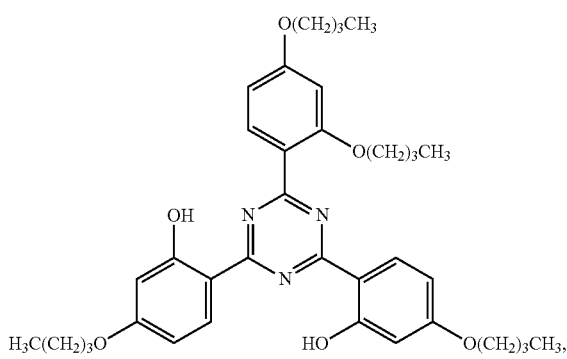

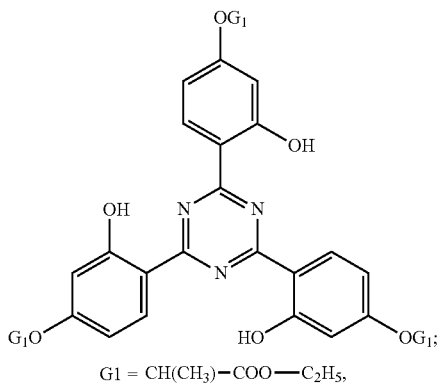

G1 = CH(CH$_3$)—COO—C$_2$H$_5$,

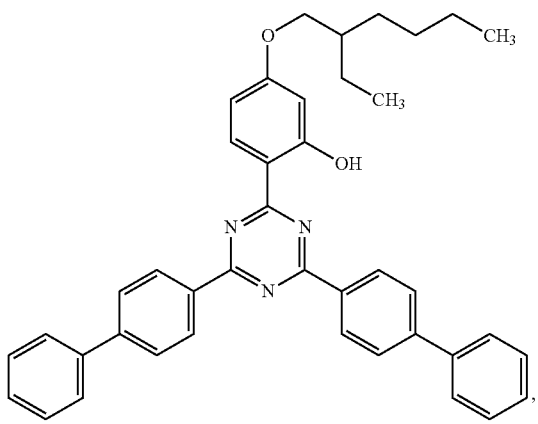

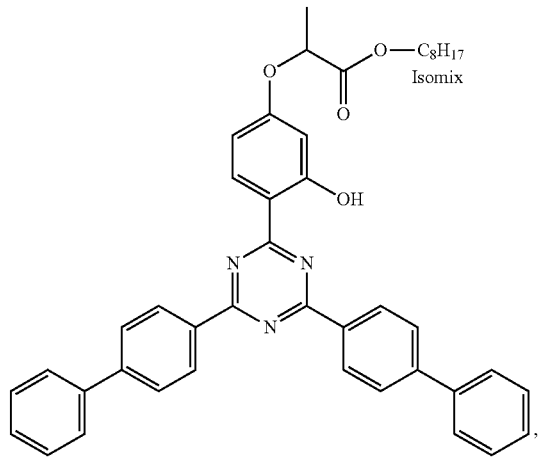

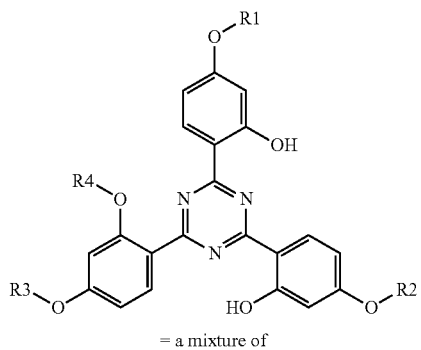
= a mixture of
a) R1 = R2 = CH(CH₃)—COO—C₈H₁₇, R3 = R4 = H;
b) R1 = R2 = R3 = CH(CH₃)—COO—C₈H₁₇, R4 = H;
c) R1 = R2 = R3 = R4 = CH(CH₃)—COO—C₈H₁₇,
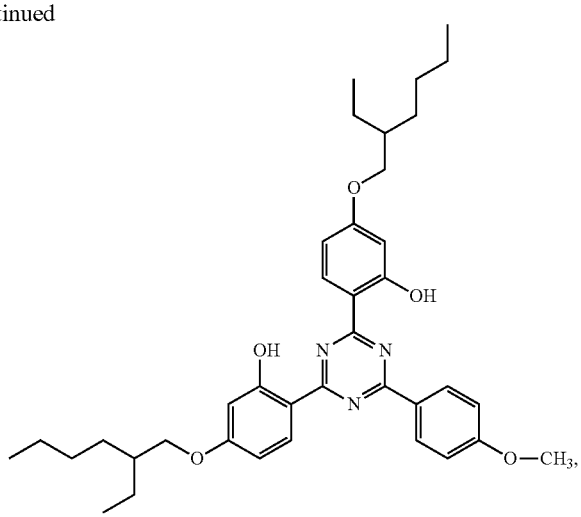
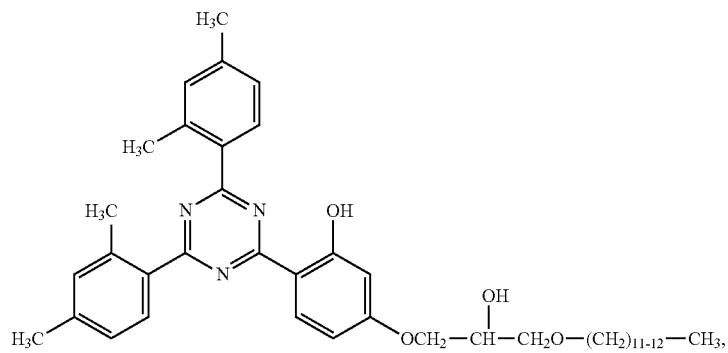
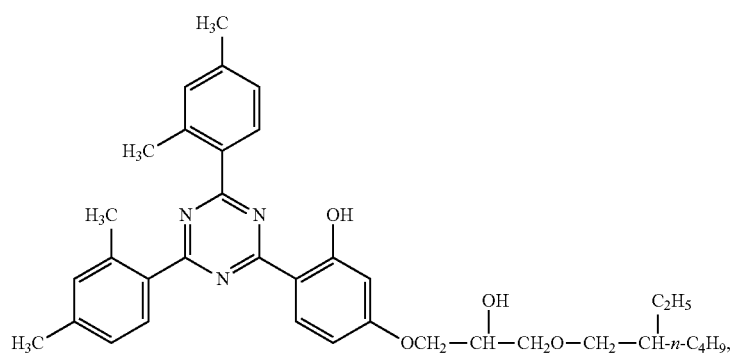
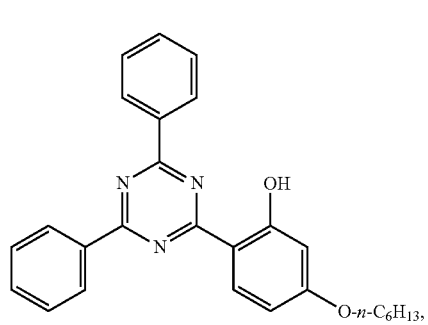
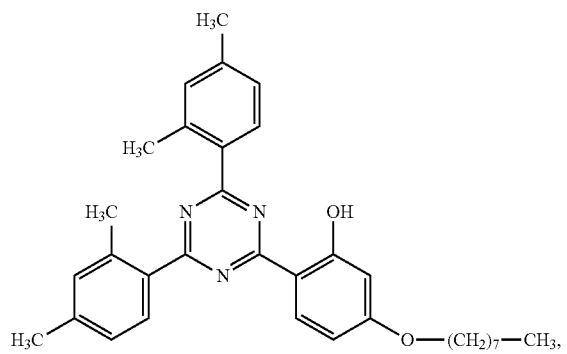

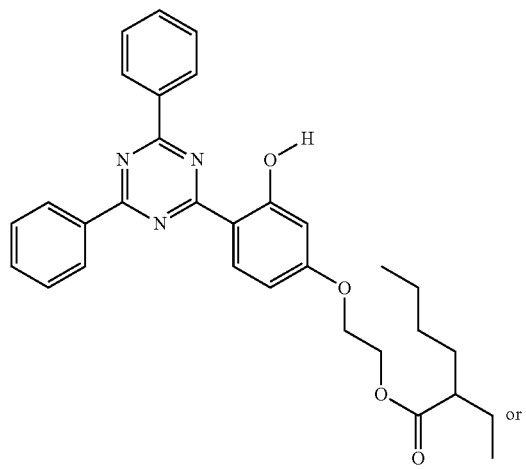 or 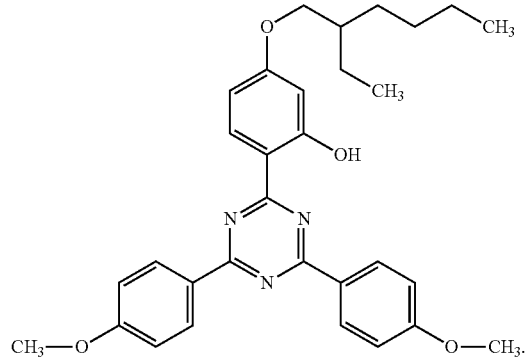

7. A composition according to claim 1 comprising a sterically hindered amine-selected from the group consisting of bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino) ethane, the condensate of 2-chloro-4,6-di-(4-n-butylamino-1,2,2,6,6-pentamethylpiperidyl)-1,3,5-triazine and 1,2-bis (3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); a condensate of 1,6-hexanediamine and 2,4,6-trichloro-1,3,5-triazine and N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis-(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine and

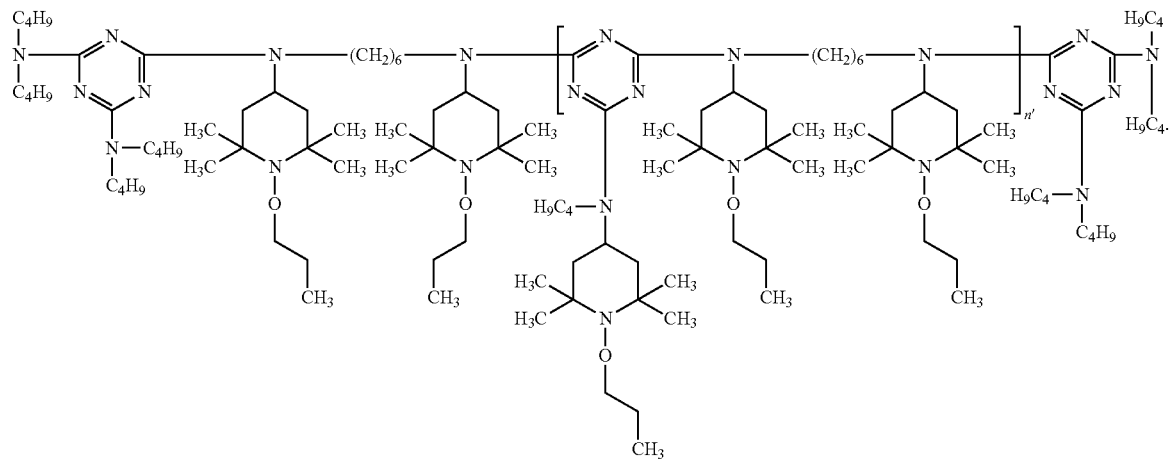

8. A composition according to claim 1 wherein the tertiary amine is a compound of formula (a).

9. A composition according to claim 1 wherein the tertiary amine is present in an amount of 0.1-2% by weight, based on the weight of the thermoplastic polymer.

10. A composition according to claim 1 wherein the UV-absorber is present in an amount of 0.01-2% by weight, based on the weight of the thermoplastic polymer.

11. A composition according to claim 1 wherein the sterically hindered amine is present in an amount of 0.01-2% by weight, based on the weight of the thermoplastic polymer.

12. A composition according to claim 1 wherein the total amount of tertiary amine, UV-absorber and/or sterically hindered amine is from 0.2 to 4% by weight based on the weight of the thermoplastic polymer.

13. A composition according to claim 1, which contains a further stabilizer selected from the group consisting of a phenolic antioxidant, a phosphite or phosphonite and benzofuranone or indolinone.

14. A method for the stabilization of a non halogen containing thermoplastic polymer which method comprises incorporating into the non halogen containing thermoplastic polymer an aliphatic tertiary amine with a molecular weight greater than 400 g/mol, which is not a 2,2,6,6 tetramethylpiperidine derivative; and a UV-absorber selected from the group consisting of hydroxyphenyl benzotriazoles, hydroxyphenyl triazines, hydroxy benzophenones and oxalic anilides; or a light stabilizer selected from sterically hindered amines; or a a mixture of the UV-absorber and the sterically hindered amine and wherein the tertiary amine is a compound of formulae (a), (b), (d), (e), (f), (g), (h), (i) or (j)

wherein $R_{301}$, $R_{302}$ and $R_{303}$ are independently $C_{10}$-$C_{36}$alkyl;
$R_{304}$, $R_{305}$ and $R_{306}$ are independently $C_9$-$C_{36}$alkyl;
$R_{310}$ and $R_{311}$ are independently hydrogen or $C_1$-$C_{18}$alkyl;
$R_{307}$ and $R_{308}$ are independently $C_1$-$C_8$alkylene;
n is a number from 2 to 20;
m is a number from 4 to 20; and
x, y independently are numbers from 3 to 20.

* * * * *